United States Patent [19]

Andersson

[11] Patent Number: 4,662,601

[45] Date of Patent: May 5, 1987

[54] HYDRAULIC VALVE MEANS

[76] Inventor: Bo Andersson, 11 Venusvägen, Ljungsbro S-590 60, Sweden

[21] Appl. No.: 742,905

[22] Filed: Jun. 10, 1985

Related U.S. Application Data

[62] Division of Ser. No. 503,131, May 27, 1985, Pat. No. 4,535,809.

[30] Foreign Application Priority Data

Sep. 28, 1981 [SE] Sweden ................................ 8105719

[51] Int. Cl.[4] .................... F15B 13/042; F16K 31/383

[52] U.S. Cl. .................................. 251/35; 137/596.15

[58] Field of Search ....................... 137/596.15; 251/35

[56] References Cited

U.S. PATENT DOCUMENTS 1,046,236 12/1912 Wagner ................................ 251/35

*Primary Examiner*—Gerald A. Michalsky

*Attorney, Agent, or Firm*—Burns, Doane, Swecker & Mathis

[57] ABSTRACT

The disclosure is directed to a valve arrangement for controlling a linear or rotary hydraulic motor. The valve is connected to a pump which acts as a pressure medium source by the valve means and to a tank. The tank connection may be either direct or indirect. The arrangement of the present invention includes at least one seat valve located in a main flow connection between the pump and a port of the motor. Each of the seat valves would adjust the flow in the main flow connection to the motor via a pilot flow adjustable by a pilot valve. The pilot flow originates from the main flow through the seat valve.

6 Claims, 24 Drawing Figures

HYDRAULIC VALVE MEANS

This application is a division of application Ser. No. 503,131, filed May 27, 1985, now U.S. Pat. No. 4,535,809.

BACKGROUND AND SUMMARY OF THE INVENTION

This invention relates to a valve means for controlling or adjusting a linear or rotary hydraulic motor, which is connected via the valve means to a pump acting as pressure medium source and directly or via the valve neans to a tank.

Known valve means of this kind and for this purpose comprise at least one pressure-controlled valve, the control pressure of which is adjusted by means of a pilot control valve. These known pressure-controlled valves normally comprise a valve slide, which adjusts both the supply of pressure medium to the motor and the return flow from the same. These known valves, however, do not always meet the demand in question, owing to internal leaking which implies, for example, that a linear motor as a double-acting hydraulic cylinder is not actuated to carry out the desired movements.

The object of the present invention, therefore, is to eliminate these disadvantages and to provide a valve means, which is flow-controlled and renders possible pressure compensation and parallel and/or series connection of several functions, as for example load sensing, pressure compensation and pressure reduction.

This object is achieved in that the valve means according to the present invention has been given the characterizing features defined in the attached claims.

BRIEF DESCRIPTION OF THE DRAWINGS

The invention is described in greater detail in the following, with reference to the accompanying drawings, in which.

DETAILED DESCRIPTION OF THE PREFERRED EMBODIMENTS

Figure 1:
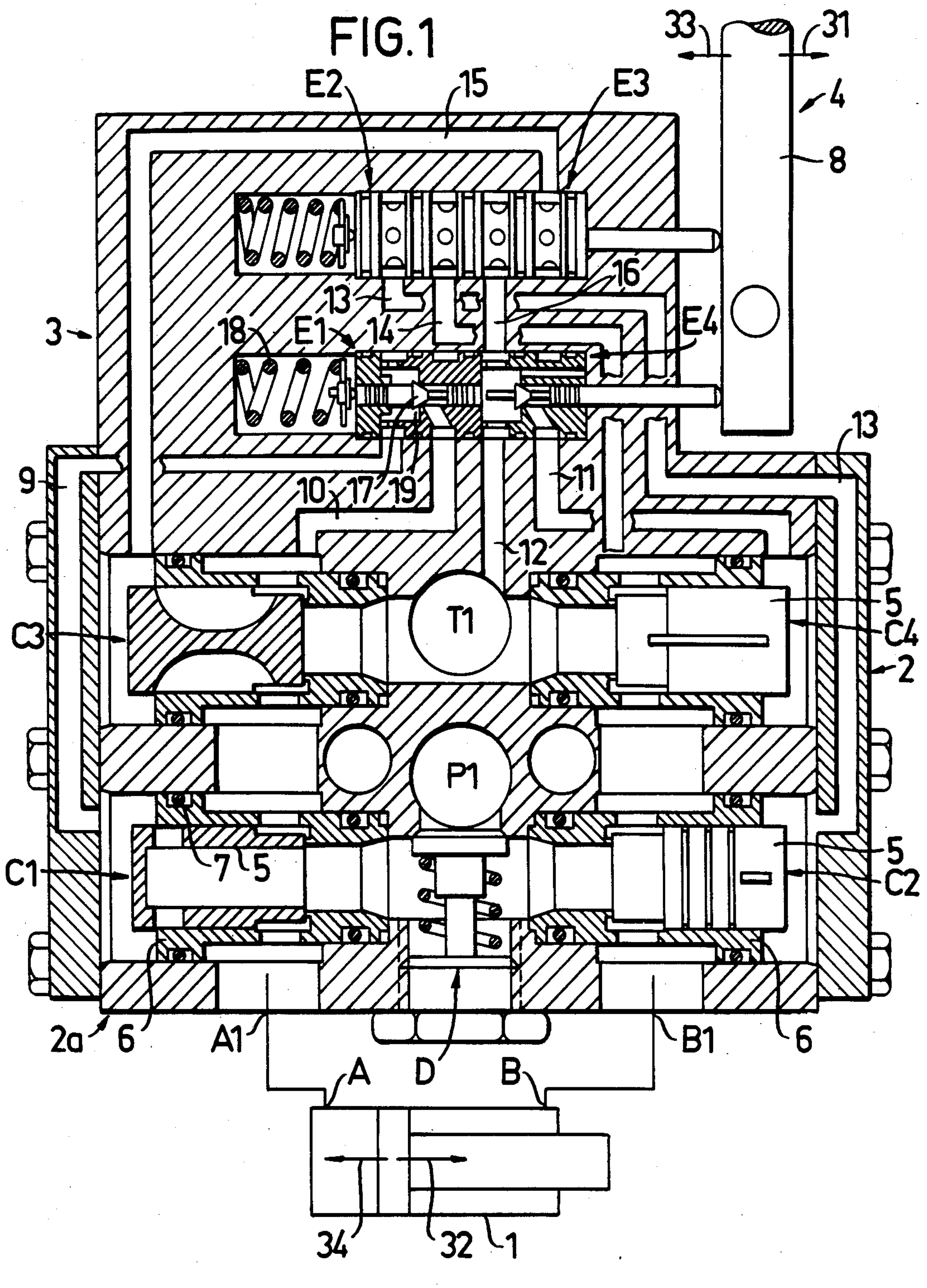
FIG. 1 is a schematic view of a section through a basic design of a valve means according to the invention for controlling a double-acting hydraulic cylinder.

The valve means according to this invention is intended to control or adjust a hydraulic motor, which in the drawings generally is designated by 1, irrespective of whether it is a single- or double-acting linear motor, for example a cylinder, or a rotary motor, and the motor ports of which are designated by A and B. The valve means is coupled to the hydraulic circuit beween the motor to be served by the valve means and a pump P acting as pressure medium source. The valve means is connected to a tank T, which in principle comprises a power valve part 2, a pilot valve part 3 and an operating part 4, which parts are assembled to one unit or section. Several such units in their turn can advantageously be assembled to a valve package for the control of several motors, as will be explained in greater detail further below.

Figure 2:
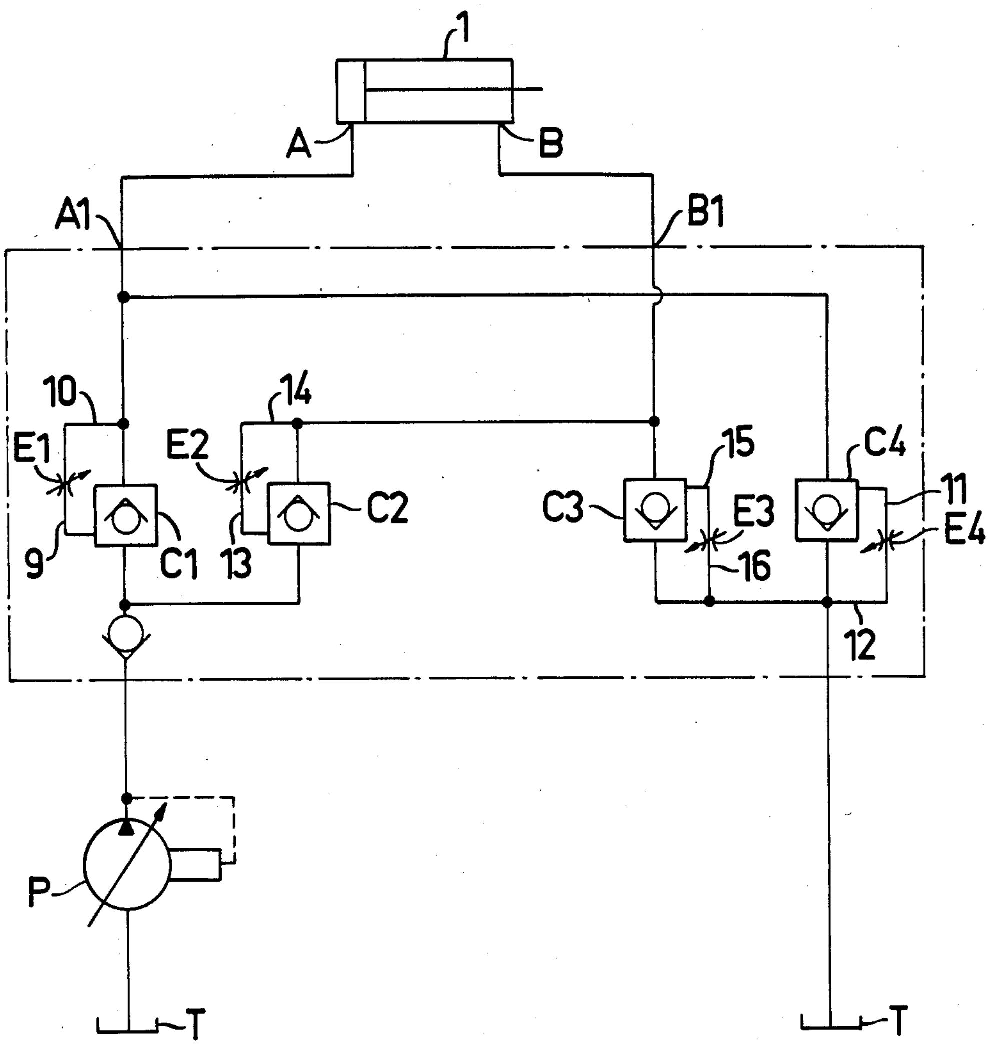
FIG. 2 is a hydraulic diagram of the embodiment shown in FIG. 1.

In FIGS. 1 and 2 a basic embodiment of the present valve means for controlling a double-acting hydraulic cylinder 1 with two motor ports A and B is shown. At this embodiment, the power valve part 2 comprises four seal valves C1, C2, C3 and C4 mounted on a valve housing 2*a*, and a check valve D located in the same valve housing. The valve housing 2*a* further is formed with a connection P1 to the pump P, a connection A1 to the motor port A, a connection B1 to the motor port B, and a connection T1 to the tank T. The seat valve C1 is located as inlet valve in a supply or inlet passageway P1–A1 between the pump connection P1 and the motor port connection A1, and the seat valve C2 is located as inlet valve in a supply or inlet passageway P1–B1 between the pump connection P1 and the motor port connection B1. The seat valve C3 is located as outlet valve in a return flow passageway A1–T1 between the motor port connection A1 and the tank connection T1, and the seat valve C4 is located as outlet valve in a return flow passageway B1–T1 between the motor port connection B1 and the tank connection T1.

The seat valves C, which advantageously can be designed, as they are shown in the drawings, as so-called cartridge units, i.e. each seat valve C comprises a movable valve cone 5 and enclosing the same a cartridge 6, which is stationary in the valve housing 2a and sealed against the same by O-rings 7. The seat valves are controlled each by a pilot valve E, which are connected to the respective seat valve by internal pilot flow channels in the valve housing. The pilot valves E further are collected in the pilot valve part 3, in pairs at the embodiment according to FIG. 1, and are actuated at this embodiment directly mechanically by an operating lever 8 comprised in the operating part 4.

The pilot valve E1, more precisely, serves or controls the seat valve C1 and is connected thereto through a channel 9 and to the motor port connection A1 through a channel 10. The pilot valve E4 controls the seat valve C4 and is connected thereto through a channel 11 and to the tank connection T1, and thereby to the tank T, through a channel 12. The pilot valve E2 controls the seat valve C2 and is connected thereto through a channel 13 and to the motor port connection B1 through a channel 14. The pilot valve E3, finally, controls the seat valve C3 and is connected thereto through a channel 15 and to the tank connection, and thereby to the tank, through a channel 16.

When the operating lever 8 is not actuated, it is in the neutral position shown in FIG. 1. In this position all pilot valves are held closed, i.e. the conic balanced valve cone 17 of each pilot valve is held abutting its valve seat 19 by a compression spring 18. Hereby, due to the absence of a pilot flow through the pilot valves E, also all seat valves C are held closed for flow in the normal flow direction, for reasons which will become apparent from the following description of the present seat valve C both as inlet valve (FIG. 3) and as outlet valve (FIG. 4), in which applications the seat valve C acts in accurately the same way, but has differently shaped valve cones 5, depending on the flow direction.

Figure 3:
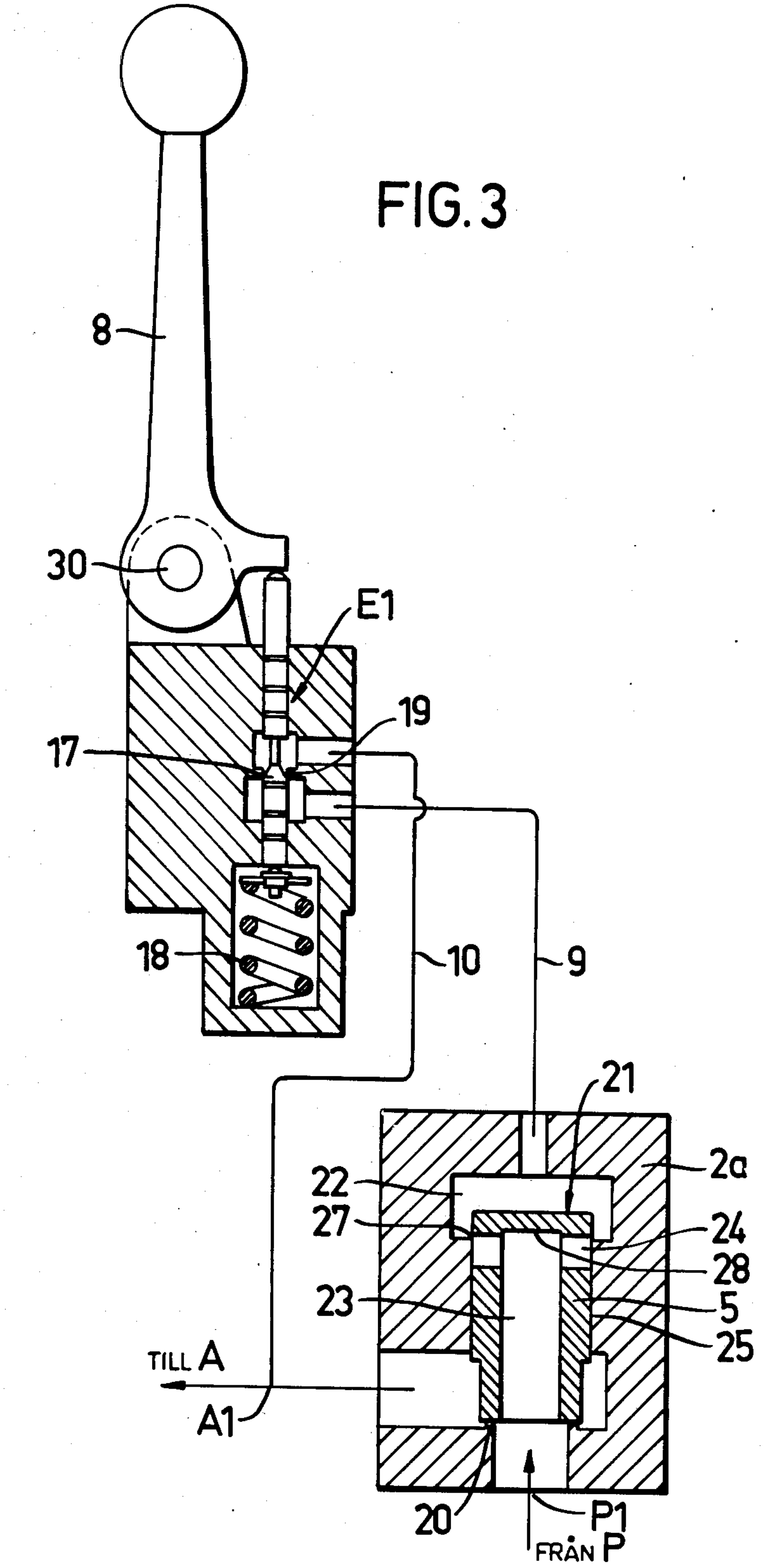
FIG. 3 is a schematic view of a section of a first embodiment of a seat valve with associated pilot valve comprised in the valve means.
Figure 4:
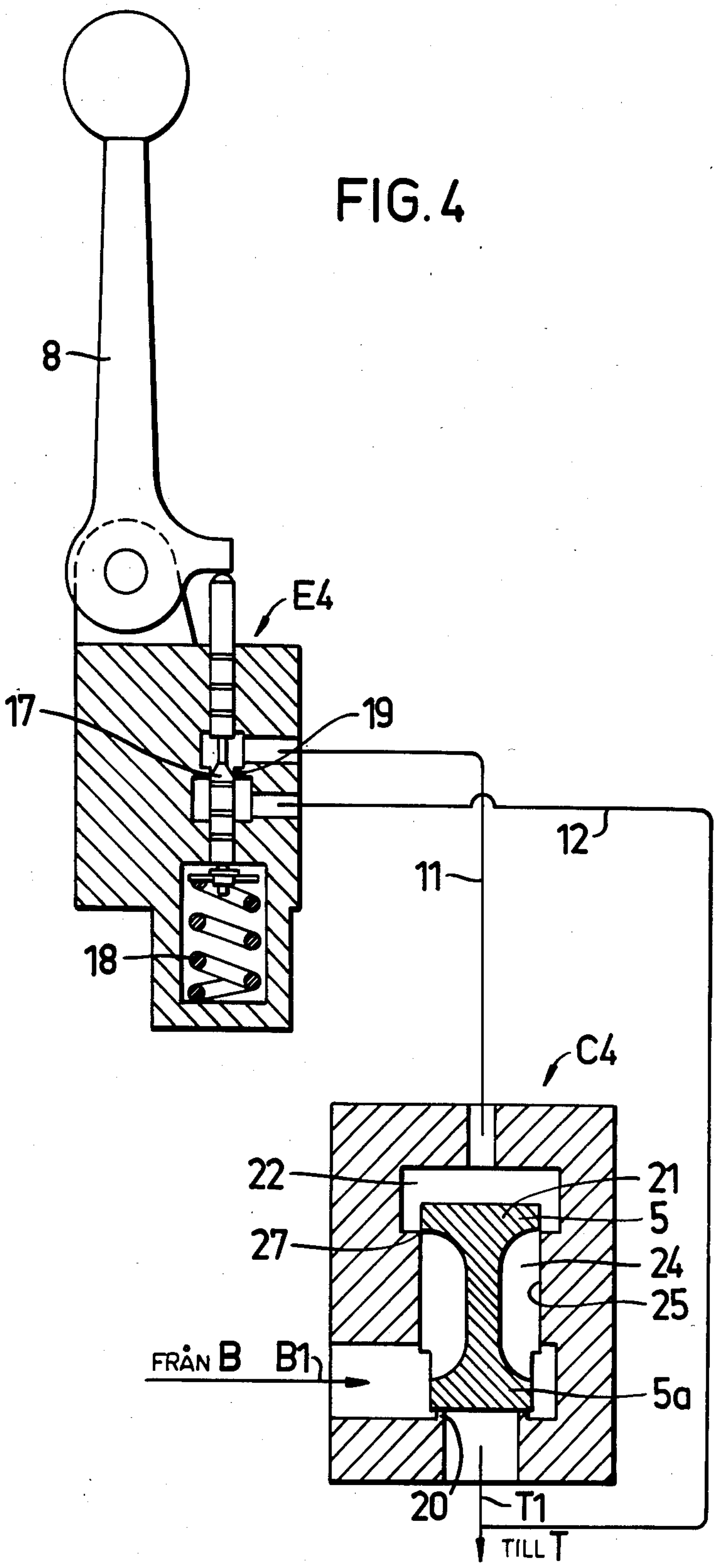
FIG. 4 is a schematic view of a section of a second embodiment of a seat valve with associated pilot valve comprised in the valve means.

As shown in FIG. 3 where as in FIG. 4 the cartridge 6 is omitted for reasons of simplicity, and as mentioned before, the seat valve with its valve cone 5 is located in a main flow passageway P1–A1, and in this passageway, between the valve inlet P1 and the valve outlet A1, a valve seat 20 is located, against which the valve cone 5 is prestressed resiliently by a force in response to the pressure in the valve inlet P1, which force acts on the end surface 21 of the valve cone which is remote from the valve seat 20. Said end surface 21 is located in a space 22, which communicates both with the associated pilot valve E and with the valve inlet P1 through a cavity 23 in the cylindric valve cone 5 and at least one connecting channel 24 formed in the side of the valve cone.

As also shown in FIG. 3, the valve seat 20 is formed with a cylindric wall 25 located radially outside the seat and enclosing the same. Said wall, which properly is formed in the cartridge 6 of the seat valve, extends axially away from the seat 20. Inside of the wall 25, the valve cone 5 which is shaped as a cylindrical plunger is movable with sealing fit to the wall 25. In the wall 25 in the cartridge 6 at least one opening 26 (see C1 in FIG. 5) is located closest to the seat and forms a connection to the outgoing portion of the main flow passageway, in which the seat valve is located. The connecting channel 24 is so positioned and designed that it forms a throttling, the flow area of which increases with increasing distance of the valve cone 5 from its seat 20. At the embodiment shown in FIG. 3 this has been achieved in that the connecting channel 24 has been given the shape of two diametrically opposed ports of axially oblong shape, which ports extend from the inner cavity 23 to the shell surface of the plunger 5. The oblong ports 24 are located at such a distance from the valve cone surface intended to abut and seal against the valve seat 20, that the end of the ports 24 which is located farthest away from said surface is located slightly outside a setoff or an outermost radial end edge 27 of the cylindrical wall 25 enclosing the valve cone 5. Hereby always, i.e. even when the valve cone 5 abuts its valve seat 20, a small connection for pressure medium from the valve inlet to the space 22 behind the valve cone 5 is formed, and hereby the pressure at completely closed pilot valve E will be the same in the space 22 as in the valve inlet. As the end surface 25 is greater than the end surface 28 of the cavity 23, thus, the valve cone 5 is held abutting its valve seat 20 and holds the seat valve C closed as long as the pilot valve E is closed and prevents a pilot flow to pass through. When, however, the pilot valve is actuated by means of the operating lever 8 for permitting a pilot flow to pass through, pressure medium flows through the throttled connecting channel 24, and the valve cone 5 hereby is caused to move from its seat 20 so much as is required for establishing balance between the pressure in the space 22 behind the valve cone 5, which pressure acts in closing direction on the valve cone, and the pressure of the pressure medium in the valve inlet P1. The valve cone 17 of the pilot valve here acts as an adjustable throttling, and the greater the pilot flow is which passes through the pilot valve, the farther away from its seat 20 extends the valve cone 5, and the greater is the main flow through the seat valve, and at fully opened pilot valve also maximum flow through the seat valve is obtained.

It can be said in other words, that the main flow through the seat valve C is a copy of the pilot flow through the pilot valve enlarged in dependency on the differences in area between the pilot flow channels and main flow channels.

The present seat valve C, thus, can be regarded as a flow amplifier. In reverse flow direction to the one shown in FIG. 3, the present seat valve can freely permit a flow to pass past the valve cone 5. This is an advantage in many practical connections, and as the valve cone 5 is not mechanically prestressed against its seat 20, for example by a compression spring or the like, the pressure drop in the reverse direction is very low, and in this flow direction the seat valve acts as a check valve easy to open and having, so to speak, built-in anti-cavitation function.

The present seat valve C, as has been mentioned, copies the flow characteristics of the associated pilot valve E with an amplifying factor independent of the nature of the characteristics, and hereby the seat valve is given a wide field of application. Another advantage of this seat valve is that the adjusting forces of the pilot valve E are very small, because only a very small portion of the total flow is used as pilot flow through the pilot valve E. The present seat valve, thus, can be controlled with very small forces, which renders the valve easy to remote control, for example by means of electric signals or the like.

As an outlet valve, as shown in FIG. 4, the seat valve is provided with a solid valve cone 5, which has no inner cavity 23, and the connecting channel 24 between the valve inlet B1 and the space 22 behind the valve cone 5 consists of at least one longitudinal notch or groove in the shell surface of the valve cone. In the closed position of the valve shown in FIG. 4, the end edge remote from the valve seat 20 of each such groove is located directly outside the outer radial end edge 27 of the cylindric wall 25 enclosing the valve cone 5 and extends from said end edge in the direction to its surface intended to abut the valve seat all the way inward to a portion 5*a* of the valve cone, which portion is located adjacent said surface and has a smaller diameter so as to form a passage, which via the opening or openings 26 in the cartridge 6 of the seat valves, which cartridge is not shown in FIG. 4 but in FIG. 5, communicates with the supply passageway B1, and hereby this passageway communicates with the space 23 behind the valve cone 5, which thereby is exposed on its end surface 21 to the same pressure as prevailing in the supply passageway B1 and thereby is held abutting its valve seat 20 and closing the valve. With this valve cone, the seat valve has the same advantages and function as with the cone shown in FIG. 3.

For operating the valve means according to the present invention, the operating lever 8, which in the Figures is shown rotatably mounted on an axle 30, is moved in one direction or the other. When the lever is moved to the right in FIG. 1, i.e. in the direction of the arrow 31, simultaneoulsy the two lower pilot valves E1 and E4 connected in series are actuated, i.e. these conic valve cones 17 are removed simultaneously from their respective valve seats 19. Hereby the channels 10 and 9 are connected to each other, so that a pilot flow responsive to the angle position of the operating lever is established through the pilot valve E1, which implies that the valve cone of the associated seat valve is moved in a corresponding degree from its seat 20 and connects the pump P with the motor port A, and also the channels 11 and 12 are connected to each other, so that a pilot flow also responsive to the angle of the position of the operating lever is established through the pilot valve E4, which implies that the valve cone 5 of the associated seat valve C4 is moved in a corresponding degree from its valve seat 20 and connects the motor port B to the tank T. Hereby, thus, a main flow determined by the degree of the position of the operating lever is obtained from the pump P via the seat valve C1 to the motor port A, and a similar return flow from the motor port B to the tank T via the tank connection T1 is obtained, and the plunger of the cylinder is caused to move in the direction marked by the arrow 32 in FIG. 1.

When the operating lever 8 is moved in the opposed direction, i.e. in the direction marked by the arrow 33 in FIG. 1, the two upper pilot valves E2 and E3 connected in series are actuated simultaneously, i.e. these conic valve cones 17 are removed simultaneously from their respective valve seats 19. Hereby the pilot flow channels 14 and 13 are connected to each other whereby a pilot flow responsive to the angle of the position of the operating lever is obtained through the pilot valve E2, which implies that the valve cone 5 of the associated seat valve C2 is moved in a corresponding degree from its valve seat 20 and connects the pump P to the motor port B, and the pilot flow channels 15 and 16 are connected to each other, whereby a pilot flow also responsive to the angle of position of the operating lever is obtained through the pilot valve E3, implying that the valve cone 5 of the associated seat valve C3 is moved in a corresponding degree from its valve seat 20 and connects the motor port A to the tank T via the tank connection T1. Hereby, thus, a main flow determined by the angle of position of the operating lever is obtained from the pump P to the motor port B, and a similar return flow is obtained from the motor port A to the tank T, and, thus, the plunger of the cylinder is caused to move in the direction marked by the arrow 34 in FIG. 1.

Figure 5:
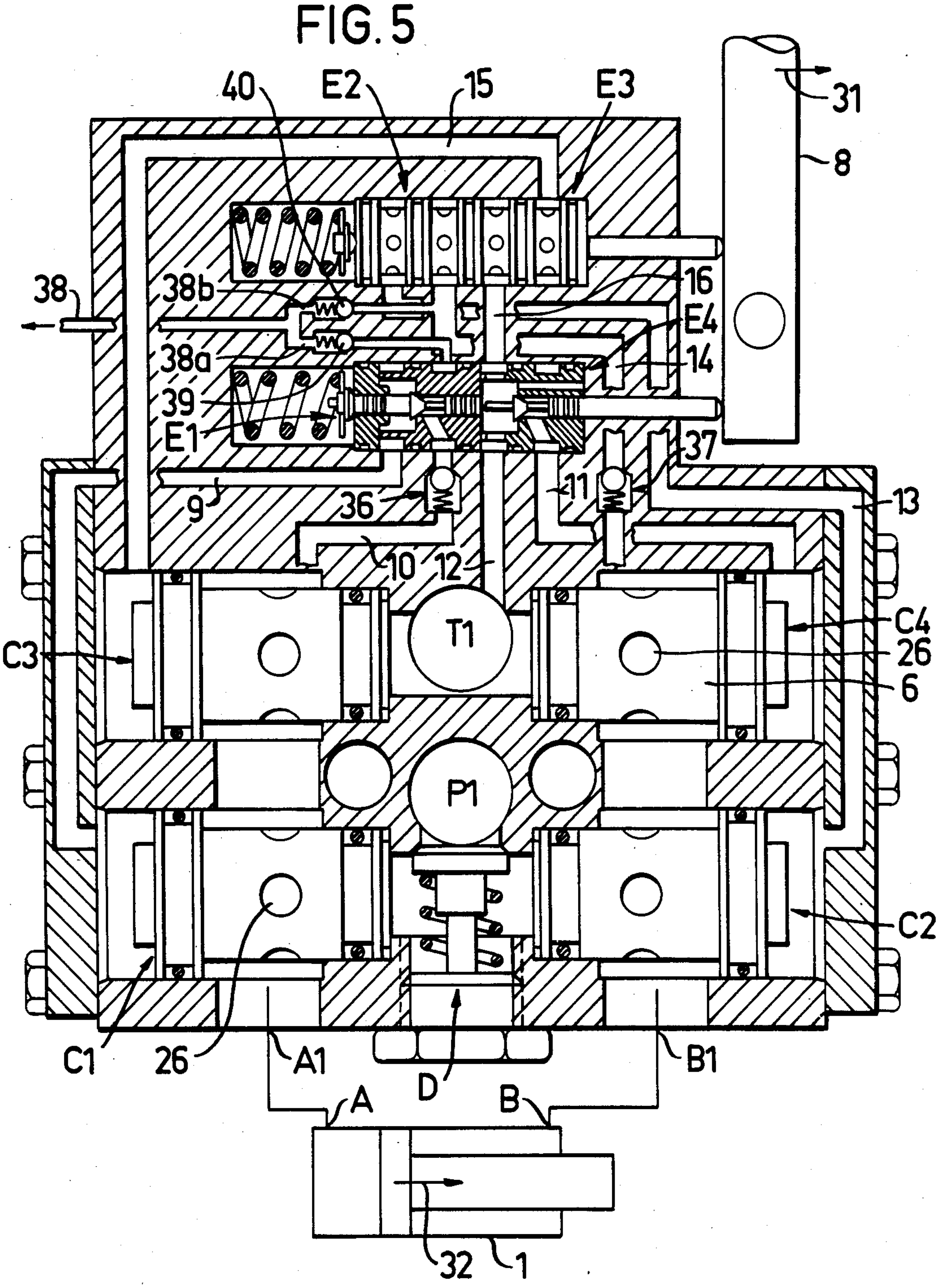
FIG. 5 is a schematic view of a valve means according to FIG. 1 provided with load-sensing.
Figure 6:
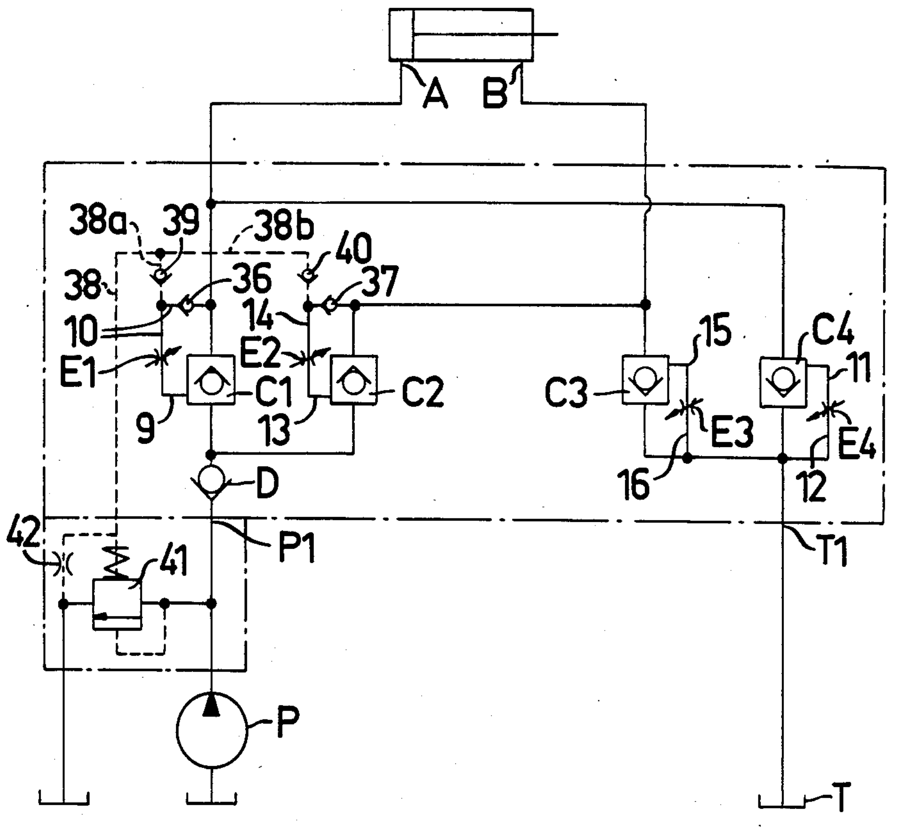
FIG. 6 is a hydraulic diagram of the embodiment shown in FIG. 5.

The valve means described in the foregoing is intended to be connected to a constant pressure source, for example a variable constant pressure controlled pump. When the valve means instead is intended to be used in a system where the motor load can vary substantially, the pump pressure must be adjusted as demanded by the load in order to reduce the effect losses. For achieving this, the valve means must be load-sensing, i.e. it must be capable to emit a signal to the pump P which describes the load pressure in question. In FIGS. 5 and 6 the valve means described above is shown equipped with such a load-sensing function. For this purpose the valve means is provided with a check valve 36 in the pilot flow channel 10 between the motor port connection A1 and the pilot valve E1, and with a check valve 37 in the pilot flow channel 14 between the motor port connection B1 and the pilot valve E2. Furthermore, a sensing channel 38 is provided, which branches into two branch channels 38*a* and 38*b*, one (38*a*) of which is connected to the channel 10 after the check valve 36, and the second one (38*b*) is connected to the channel 14 after the check valve 37. The branch channels are provided each with a check valve 39 and, respectively, 40, which act in opposed direction to the check valve 36 and, respectively, 37. The sensing channel 38 also is connected, as shown in FIG. 6, to an adjusting device 41 for the pump P and to the tank T via a throttling 42.

When the valve means is not actuated and, thus, the operating lever 8 is in neutral position, the two check valves 36 and 37 are held closed. As the pilot valves E in this position also are closed, no sensing signal is received in the sensing channel 38 to the adjusting device 41 of the pump, but the pump P, so to speak, runs idle. When the operating lever 8 now is moved in the direction of the arrow 31, the two lower pilot valves E1 and E4 are opened, whereby the valve E1 connects the pump connection P1 where pump pressure prevails to the sensing channel 38 via the seat valve C1 and its connecting channel 24 (see FIGS. 1 and 3) and the channel 9. When now the load pressure in the motor port A acting on the check valve 36 exceeds the prevailing pump pressure, the pump pressure is not capable to open the check valve 36, but this valve is held closed. The prevailing pump pressure, however, effects an increase in the sensing pressure in the sensing channel 38, and thereby a signal is received through the throttling 42 to the adjusting device 41 of the pump, resulting in an increase in the pump pressure. When this pump pressure does not exceed, either, the load pressure in the motor port A and on the check valve 36, the sensing pressure is increased additionally, which in its turn results in an increasing pump pressure, which results in an increasing sensing pressure a.s.o., until the pump pressure exceeds the load pressure in the motor port A, whereby the check valve 36 is opened. As soon as the check valve 36 opens, a pilot flow starts through the pilot valve E1 and causes the seat valve C1 connected to said pilot valve to open and to connect the pump connection P1 to the motor port A whereby the piston of the cylinder is moved in the direction of the arrow 32. The pressure in the channel 9 and after the check valve 36 is not determined any longer by the pump pressure, but by the load pressure in the motor port A. This pressure propagates past the check valve 39 to the sensing channel 38 and to the adjusting device 41 of the pump, whereby the check valve 40 prevents drainage of the sensing pressure via the seat valve C4, which is connected to the motor port B and now is open.

As long as the check valve 36 is open, the pressure in the sensing channel 38 is determined by the pressure in the motor port A, i.e. by the load pressure, unless another valve means comprised in the same pump circuit delivers a higher sensing pressure. When several valve means are connected to the same sensing channel or sensing conduit 38, the check valves 39 and 40 attend to that the highest sensed load determines the pressure in the sensing circuit 38 to the adjusting device 41 of the pump. In other words, the present valve means with load-sensing always is pressure compensated for the function, which requires the highest pump pressure, i.e. the function, which determines the pressure in the sensing conduit 38.

By this load-sensing valve means according to the invention, thus, the pump P is controlled in such a manner, that a suitable pump pressure is obtained at each occasion, and this pump pressure exceeds the sensed load pressure by a number of bars, whereby the difference between the pump pressure and load pressure results in a pressure drop over the valve and compensates for possible line losses. For the seat valve C, the load pressure of which is sensed, in this way a load-independent speed control is obtained, i.e. the piston speed depends only on the degree of the angle formed by the operating lever 8 with the neutral position, and is independent of the size of the load pressure. By the load sensing function described is further achieved, that at the coupling-in of the valve means only the load pressure is sensed which is to be connected to the pump connection, and not the load pressure which is to be connected to the tank connection, that when the valve means is not coupled-in no load pressure is sensed, whereby the pump P is relieved and so to speak, runs idle, and that when several valve means are connected to the same pump circuit the sensing lines can be coupled together with each other, so that the highest sensed load pressure determines the pressure in the sensing line 38 to the adjusting device 41 of the pump.

Figure 7:
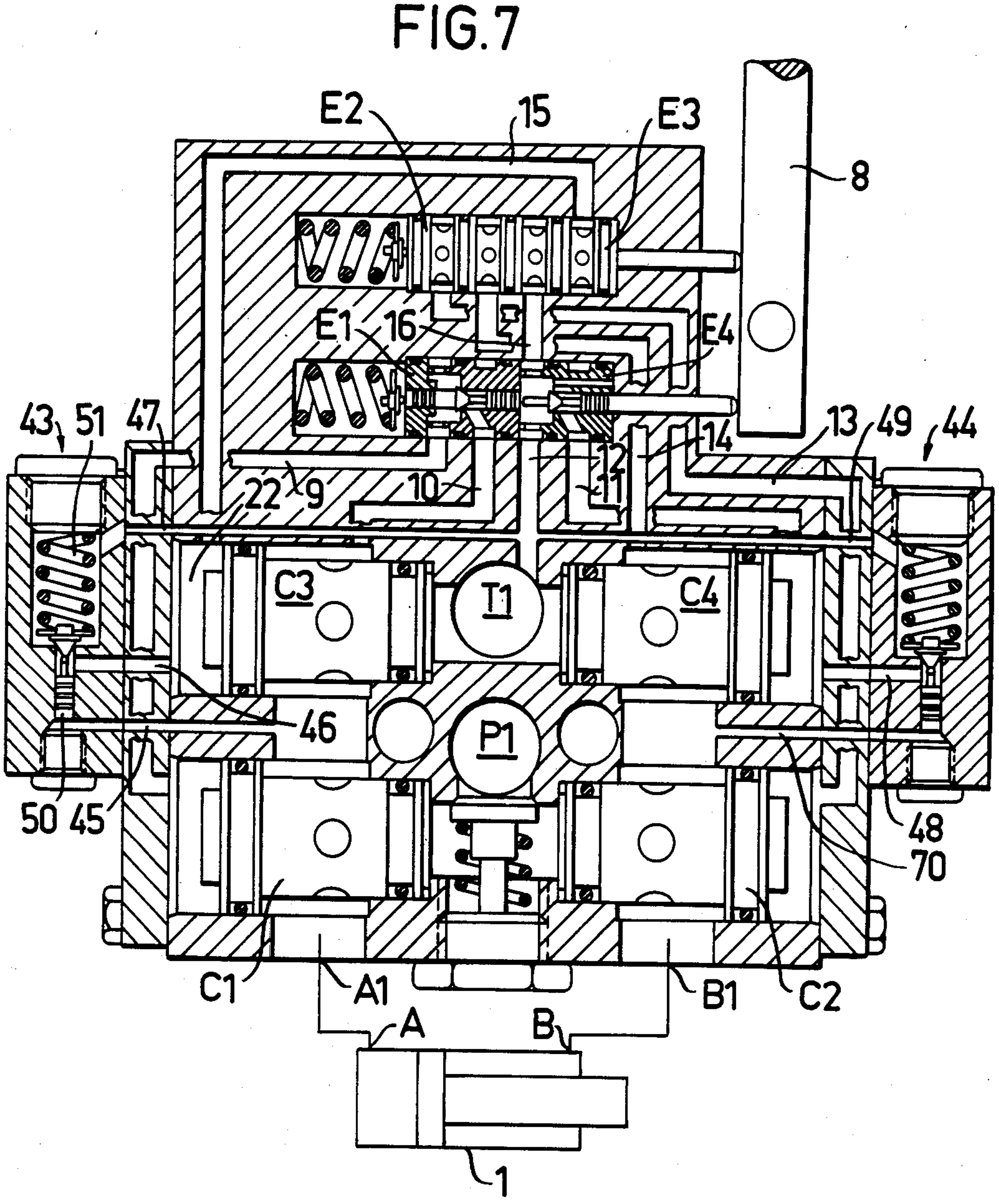
FIG. 7 is a schematic view of a valve means according to FIG. 1 provided with pressure reducing function in the motor ports.
Figure 8:
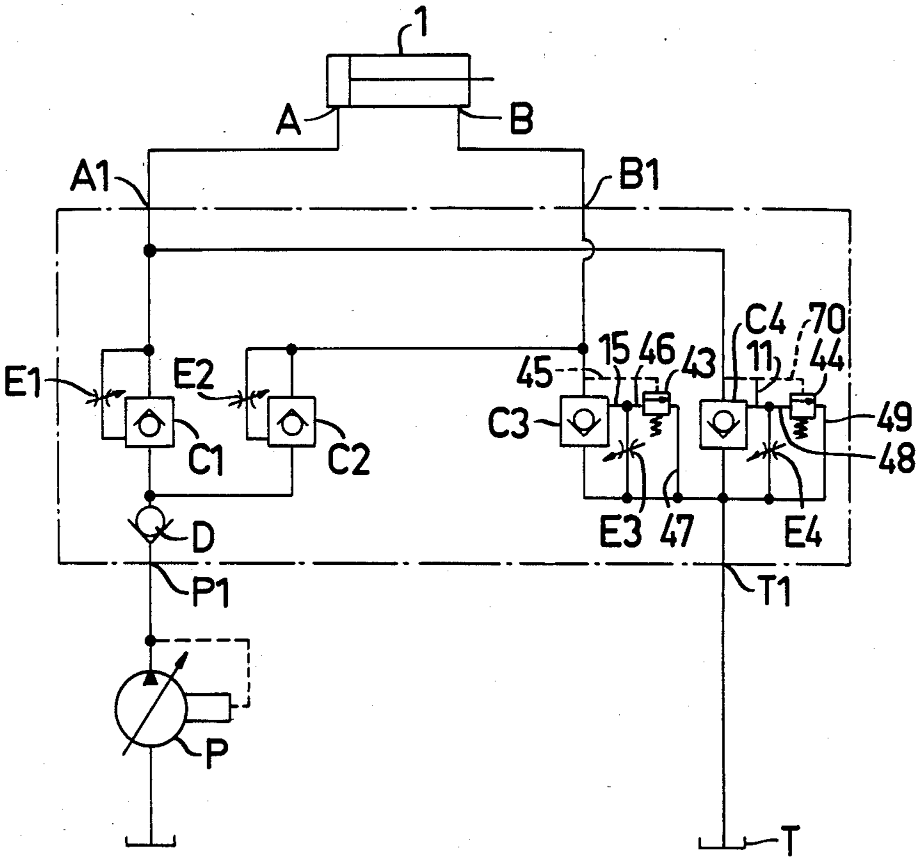
FIG. 8 is a hydraulic diagram of the embodiment shown in FIG. 7.

In accordance with the principles, on which the present valve means is based, the main flow through the respective seat valve is controlled by controlling a small flow, pilot flow, through a corresponding pilot valve E. This control principle renders it possible in a simple way to connect to a seat valve C several pilot valves in series or in parallel. Such an application is shown in FIGS. 7 and 8, where the two seat valves C3 and C4, which can connect the motor port A and B to the tank connection T1, have been equipped each with an additional pivot valve 43 and, respectively, 44. These two valves act in principle in the same way as the ones described above, i.e. the mechanically actuated pilot valves E, but are hydraulically actuated by the pressures sensed in the motor ports. For this purpose, the pilot valve 43 is connected on its pressure side to the motor port connection A1 through a control channel 45 and to the space 22 of the seat valve C3 through a channel 46, and on its compression spring side to the tank connection T1 through an evacuation channel 47. In the same way, the pilot valve 44 is connected on its pressure side to the motor port connection B1 through a control channel 70, to the space 22 of the seat valve C4 through a channel 48 and on its pressure spring side to the tank connection T1 through an evacuation channel 49.

The pressure prevailing in a motor port, for example port A, which pressure through the channel 45 also acts on the end area of the pilot slide 50 of the pilot valve 43, gives rise to a force, which is counteracted by a compression spring 51, which is prestressed and comprised in the pilot valve. When the pressure in the motor port A is so high that the resulting force exceeds the prestressed force of the compression spring, the pilot valve 43 opens and a control flow is obtained through the valve 43 to the tank connection T1 and thereby to the tank. When the pilot valve 43 opens, also pressure medium flows from the space 22 behind the valve cone 5 in the seat valve C3, and thereby also its valve cone 5 is moved in the direction from its valve seat 20. Thereby the seat valve C3 is capable to permit a greater flow to pass to the tank via the tank connection T1, until the pressure in the motor port connection A1 again is lowered to the level intended, whereby the pilot valve 43 is closed. In a corresponding manner also the pilot valve 44 acts. In other words, these pilot valves 43 and 44 acting as pressure limiting means effect pressure limiting in the motor ports A and B.

Figure 9:
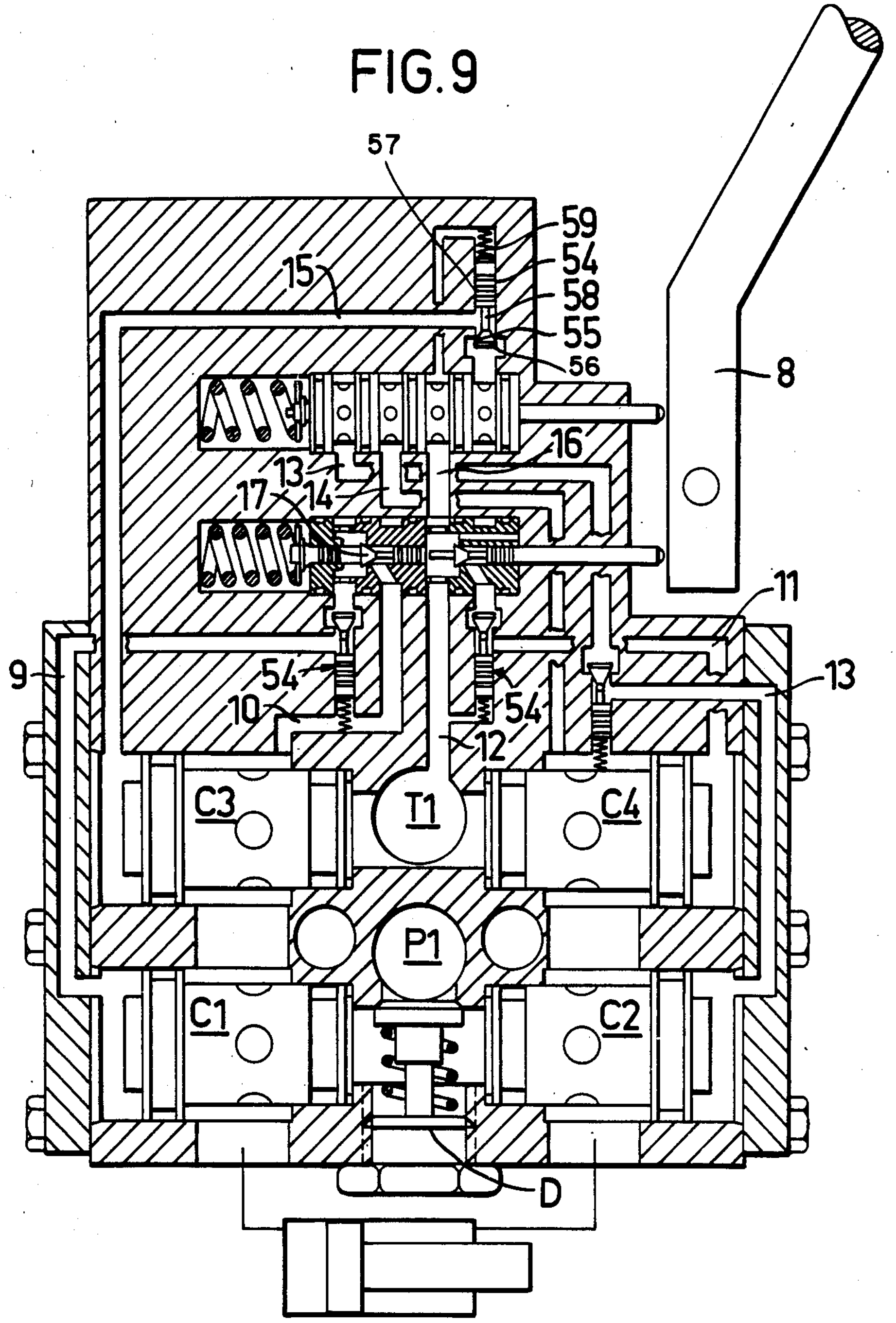
FIG. 9 is a schematic view of a valve means according to FIG. 1 with pressure compensation.
Figure 10:
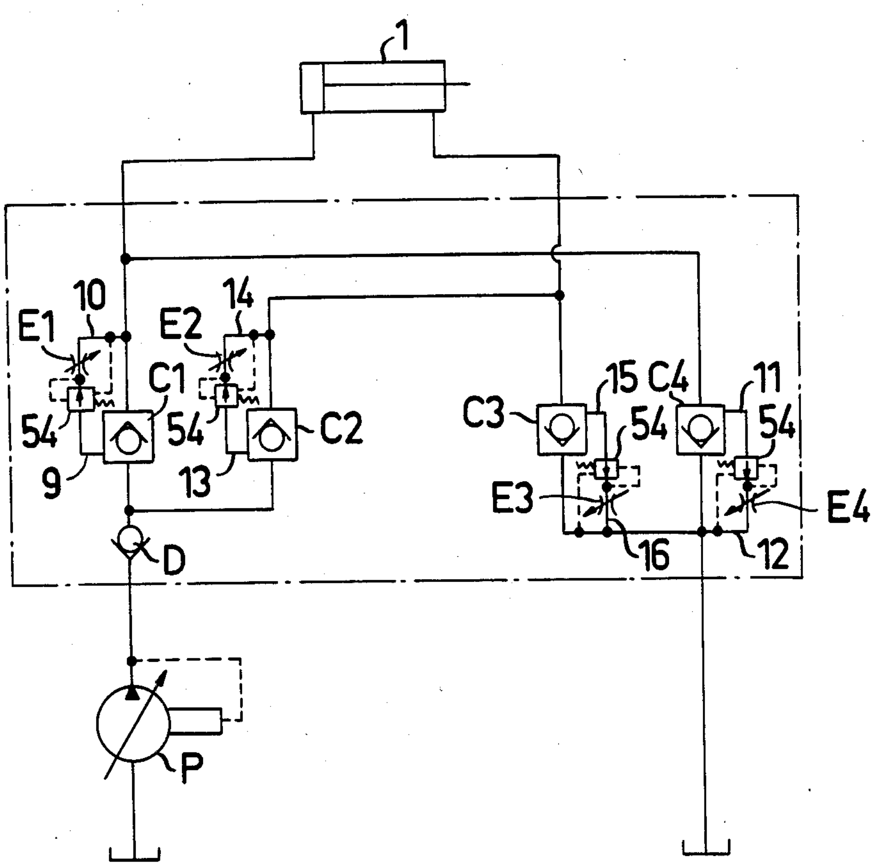
FIG. 10 is a hydraulic diagram of the pressure compensated embodiment shown in FIG. 9.
Figure 13:
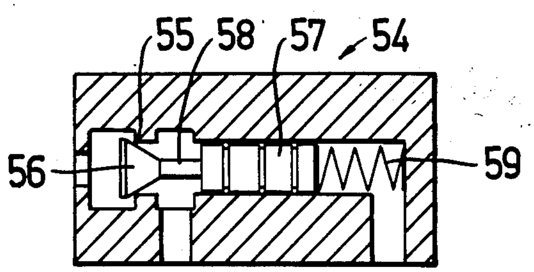
FIG. 13 is a section through a normally compensating pressure compensator.

As appears from the foregoing, the flow through a seat valve C is determined by the flow area of the valve, more precisely by the position of its valve cone in relation to the valve seat and the pressure drop over the valve. The pressure drop over the valve cannot be affectd by the operator who, therefore, instead must compensate for pressure variations by changing the deflection of the operating lever so that the desired flow and therewith the desired motor speed are obtained. This implies that a machine with many functions, and at which the load pressure always varies substantially, is very difficult to operate. The control principle, however, on which the valve means according to the present invention is based, also permits to eliminate the said operation difficulties in a very simple way. In FIGS. 9 and 10 an embodiment of the present valve means is shown, which is constructed so that a certain deflection of the operating lever 8 always is corresponded by a certain flow through the valve means, and thereby by a certain speed of the motor 1, irrespective of load pressure and pump pressure. This is achieved in that the pilot flow through each pilot valve E concerned is made insensitive to pressure variations, and thereby a pressure-independent flow control of the seat valves of the valve means is obtained. The valve means, in other words, is pressure-compensated. This insensitiveness to pressure is achieved by means of a pressure reducer 54, which is located before the pilot valve E to the seat valve C to be pressure-compensated. At the embodiment shown in FIGS. 9 and 10 where every seat valve C is pressure-compensated, a pressure reducer 54 is provided in each of the pilot flow channels 9,11,13 and 15 to the pilot valves E. The said channels open into the respective pressure reducer 54 between a valve cone 56 co-acting with a valve seat 55 and a slide 57, which is rigidly connected to the valve cone 56 through a member 58 provided with a small diameter. At the embodiment shown in FIGS. 9, 10 and 13 the slide 57 and the valve seat 55 have the same diameter, which implies that the resulting force on the pressure reducer caused by the pressure in the ingoing channel 9,11,13 and, respectively, 15 is zero. The slide 57 of each pressure reducer is actuated by a spring 59 and connected to the second channel 10,12,14 and, respectively, 16 of the associated pilot valve, and the slide 57, thus, is affected also by the pressure prevailing in this channel. In FIG. 13 the pressure reducer to the pilot valve E1 is shown. Each pressure reducer 54, thus, reduces the pressure before the pilot valve to a certain level over the pressure downstream of the valve, i.e. in the channel 10,12,14 and, respectively, 16. Hereby never a pressure drop over the variable throttling 17 of the associated pilot valve is obtained which is greater than corresponded by the spring force acting on the slide 57 of the pressure reducer. Mathematically this can be expressed as $t_1=t_2+t_f+k$, where $t_1$ is the pressure between the valve cone 56 of the pressure reducer and the valve cone 17 of the associated pilot valve, $t_2$ is the pressure acting on the slide 57 of the pressure reducer, $t_f$ is the spring force, and k is a constant, which is zero at the embodiment shown in FIGS. 9, 10 and 13.

The control principle on which the valve means according to the present invention is based, thus, permits that only the small pilot valves E must be pressure-compensated for pressure-compensating the entire valve means. It is, of course, not necessary to pressure-compensate all seat valves, if such is not required in the connection in which the valve means is to be used.

Figure 11:
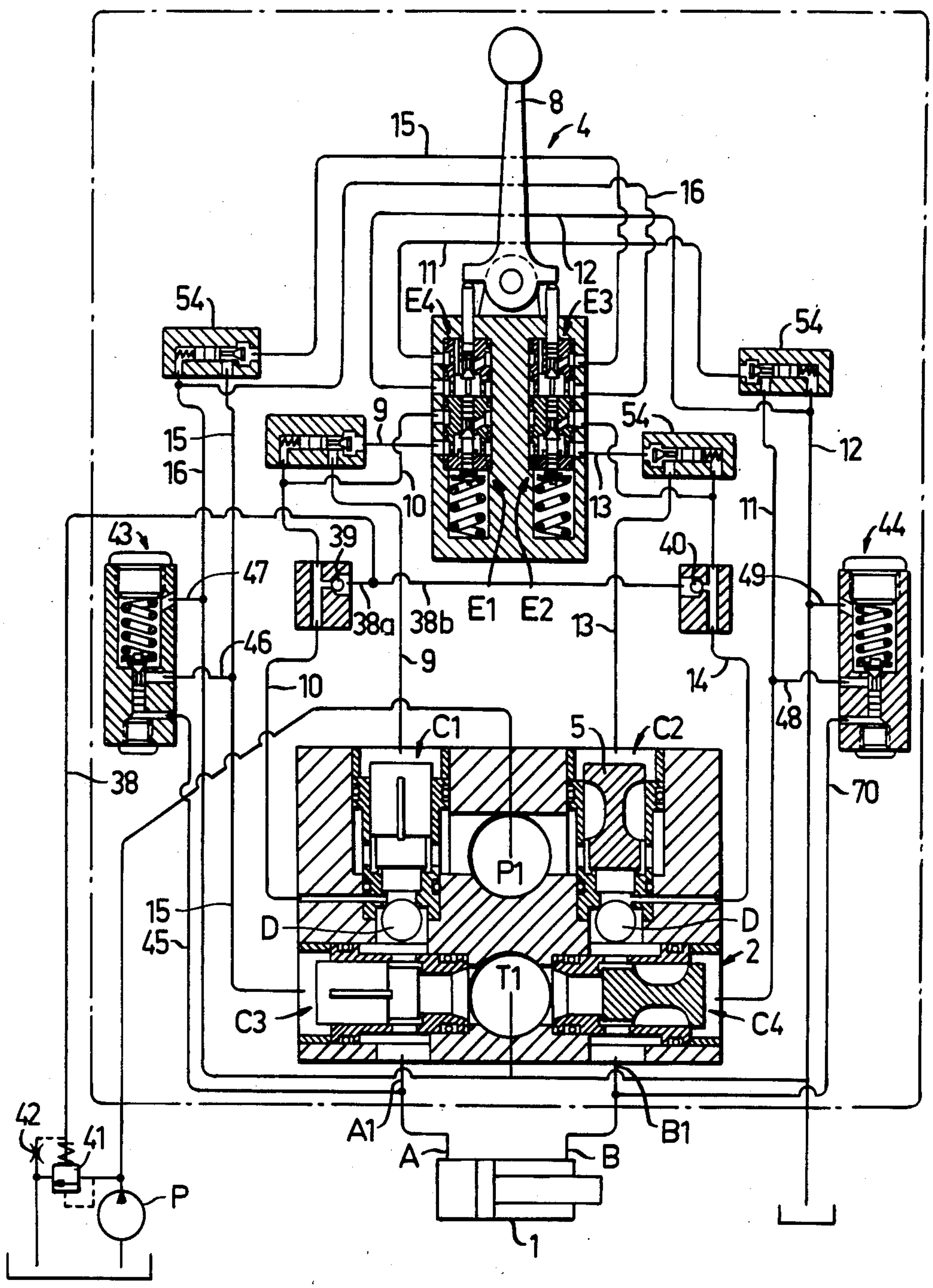
FIG. 11 is a schematic view of a valve means according to the invention with load sensing as well as pressure reduction and pressure compensation.
Figure 12:
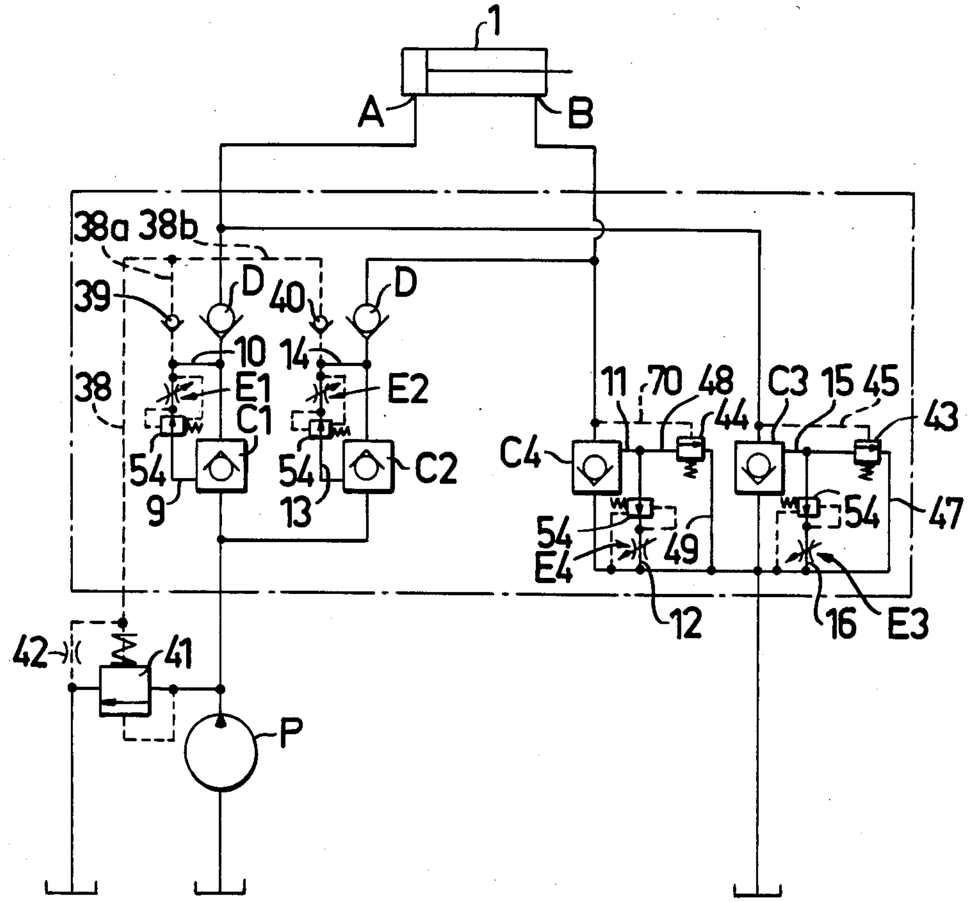
FIG. 12 is a schematic view of a hydraulic diagram of the valve means shown in FIG. 11.

In FIGS. 11 and 12 an embodiment of a valve means according to the invention is shown which comprises all of the aforesaid functions, i.e. load sensing through the check valves 36,39,37,40, pressure limiting in the motor ports through the pilot valves 43 and 44, and pressure compensation through the pressure reducers 54. At this embodiment, the seat valves C in the power valve part 2 are arranged so that they have the same type of valve cone, more precisely the type shown in FIG. 4 with connecting channels 24 in the form of grooves provided in the solid valve cone 5. The seat valves C1 and C2 acting as inlet valves are arranged vertically each on one side of the pump connection P1 and above the seat valves C3 and C4, which are arranged horizontally and act as outlet valves, which seat valves C3 and C4 are located each on one side of the tank connection T1. The check wave D at the aforedescribed embodiments has been replaced by two check valves D, one of which is located in the main flow channel between the motor port connection A1 and the seat valve C1, while the second check valve D is located in the main flow channel between the motor port connection B1 and the seat valve C2. This implies, that for the load sensing only the check valves 39 and 40 are required, because the check valves D have the same function as the check valves 36 and 37 at the embodiment shown in FIG. 6.

The pressure limiting pilot valve 43 is connected with its channels 45,46 and 47 to the motor port connection A1, the pilot flow channel 15 and, respectively, the pilot flow channel 16 leading to the tank. The second pressure limiting pilot valve 44 is connected with its channels 70, 48 and 49 to the motor port connection B1, the pilot flow channel 11 and, respectively, the pilot flow channel 12 leading to the tank.

The pressure reducers 54 for the pilot valves C are located in the way described above in the pilot flow channels 9,11,13 and 15 and are connected with their slide 57 to the second flow channel 10,12,14 and 16 of the respective pilot valves. The pressure reducers 54 shown in FIG. 11 as well as in FIGS. 9, 10 and 13 are constant pressure reducing, implying that the motor speed is proportional to the lever deflection, irrespective of the pressure difference over the pilot valve C in all positions.

Figure 14:
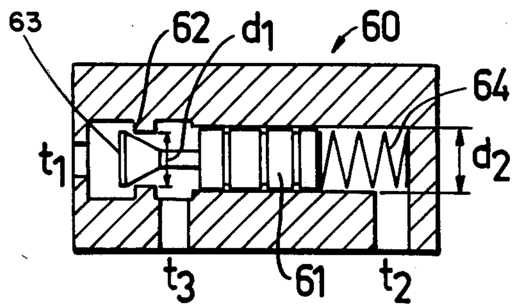
FIG. 14 is a section through an over-compensating pressure compensator.

In FIG. 14 an overcompensated pressure reducer 60 is shown which has the same structural design as the constant pressure reducer 54 in FIG. 13 and can replace the same in cases when lower motor speed at increasing pressure is desired, i.e. it can be used, for example, as lowering brake for a jib and in that case is connected to any one of the pilot valves E acting as outlet valves of the seat valves.

The overcompensated pressure reducer 60 comprises a slide 61 with a diameter exceeding the diameter of the valve seat 62 co-acting with the valve cone 63, which implies that the pressure acting in the intermediate space between the valve cone 63 and slide 61 brings about a force, which acts against the spring 64 acting on the slide, and this force, thus, increases with increasing pressure in said space. The higher the pressure, the smaller is the flow. Mathematically this can be expressed as $t_1=t_2+t_f+k\cdot t_3$, where $t_1$ is the pressure on the outside of the valve cone, $t_3$ is the pressure in the space between the valve cone and the slide, $t_2$ is the pressure on the slide, $t_f$ is the spring pressure, and k is a constant, which is negative and expresses the relation between the diameters $d_1$ and $d_2$.

Figure 15:
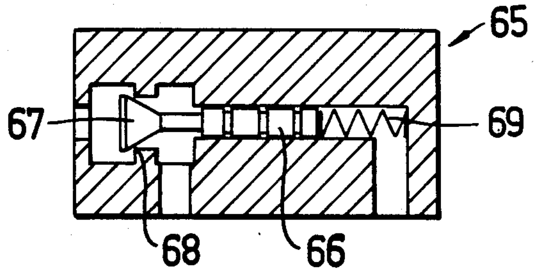
FIG. 15 shows a sub-compensating pressure compensator.

In FIG. 15 an undercompensated pressure reducer 65 is shown, which comprises a slide 66 with a diameter which is smaller than the diameter of the valve seat 68 co-acting with the valve cone 67, which implies that the pressure acting in the intermediate space between the valve cone 67 and slide 65 brings about a force, which acts in the same direction as the force exercised by the spring 69, and which is positive. The lower the pressure, the greater is the flow, and thereby the speed. The undercompensated pressure reducer 65, thus, acts inversely to the overcompensated pressure reducer and can be used where it is deemed suitable.

Figure 17:
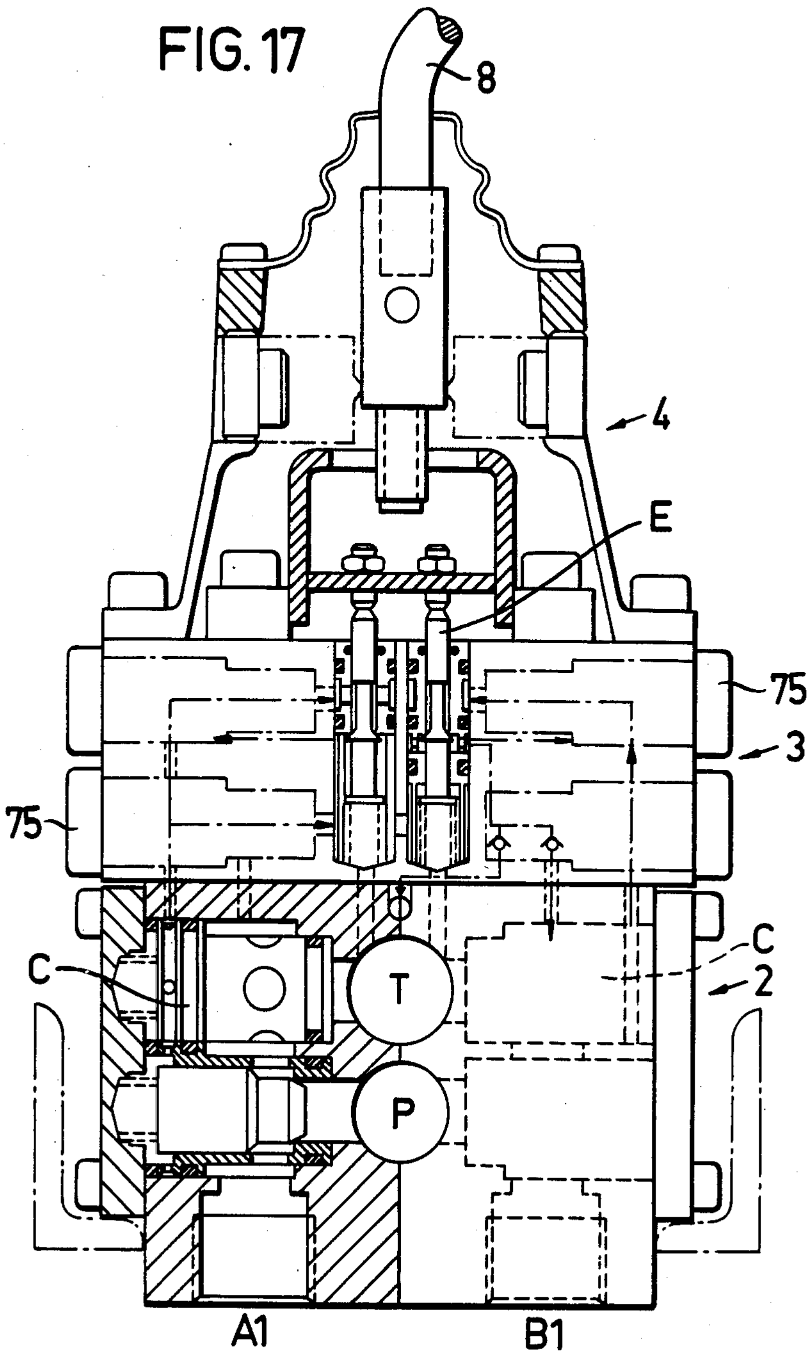
FIG. 17 is a section through the valve package substantially along the line XVII—XVII in FIG. 16.

In FIG. 17 a practical embodiment of a valve means according to the invention is shown, comprising the power valve part 2, the pilot valve part 3 and the control part 4 assembled to one unit. In the power valve part 2 the seat valves C are arranged exchangeable, and in the pilot valve part 3 the pilot valves E are arranged vertically and exchangeable. In the pilot valve part 3, furthermore, function plugs 75 are exchangeably secured on both sides of the vertically arranged pilot valves E. Said plugs are, for example, screwed in and include the means required for the aforedescribed functions, such as load sensing, pressure compensation and pressure limitation. By this degin, a valve means according to the invention can be changed easily for different fields of application, and if some function is not required, its function plug can be replaced by a blind plug. In the different parts, of course, the said channels are formed in a suitable way for rendering possible the structural design shown of the valve means.

Figure 16:
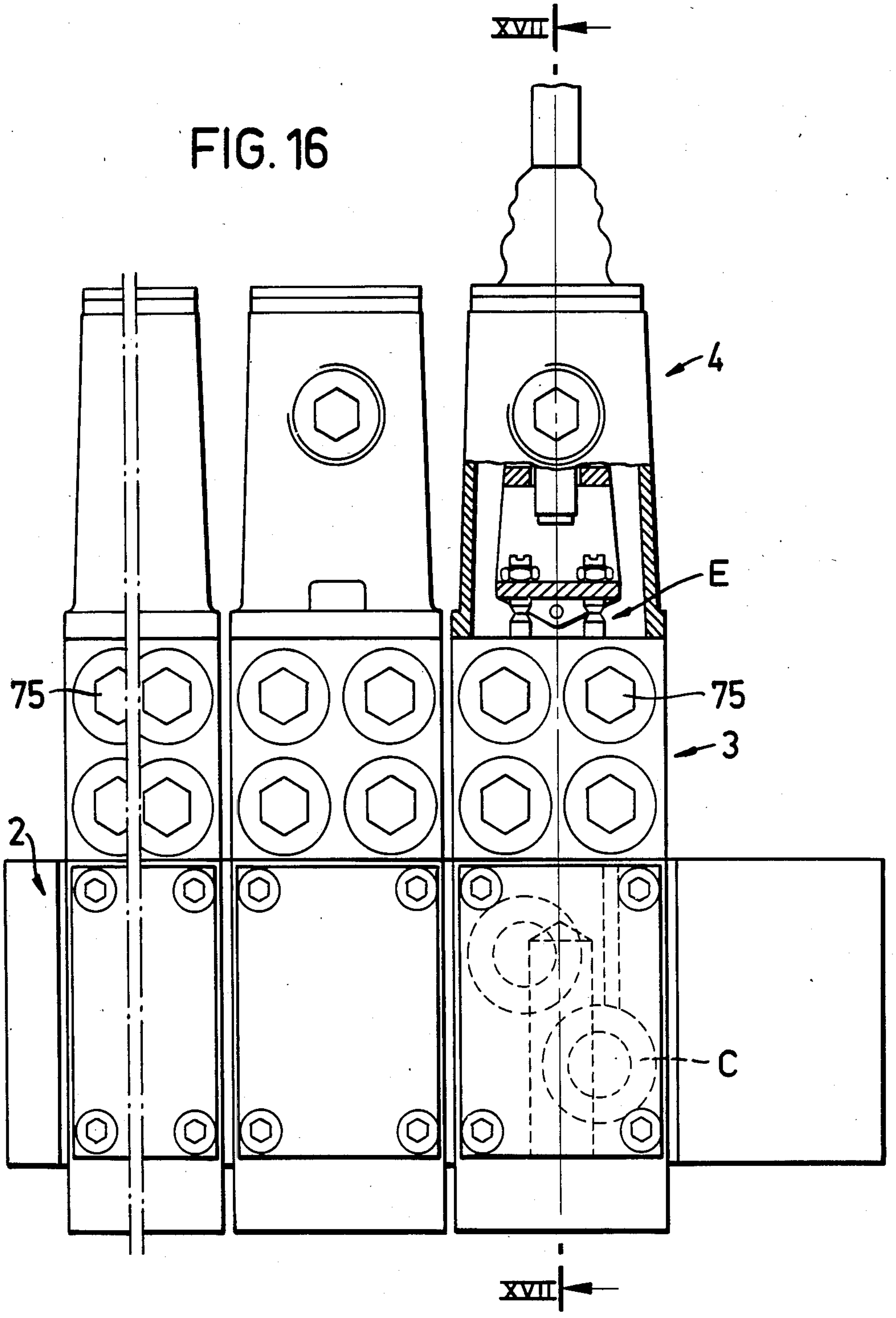
FIG. 16 is a side view, partly in section, of a valve package consisting of several valve means according to the invention.

In FIG. 16 is illustrated that several valve means according to the invention can be assembled to one valve package for controlling several motors with one single pump circuit.

As regards the control part 4, at the embodiment shown in the Figures the pilot valves E are actuated in pairs directly by the operazing lever 8, but also other ways of operating the pilot valves E are possible, for example by means of electric control. Also individual control of the pilot valves E can be imagined, and such individual control implies that combinations of simultaneously controlled seat valves other than the combinations described above are possible. In such a case floating position, pump relief or quick transport (regenerative control) are possible.

Figure 18:
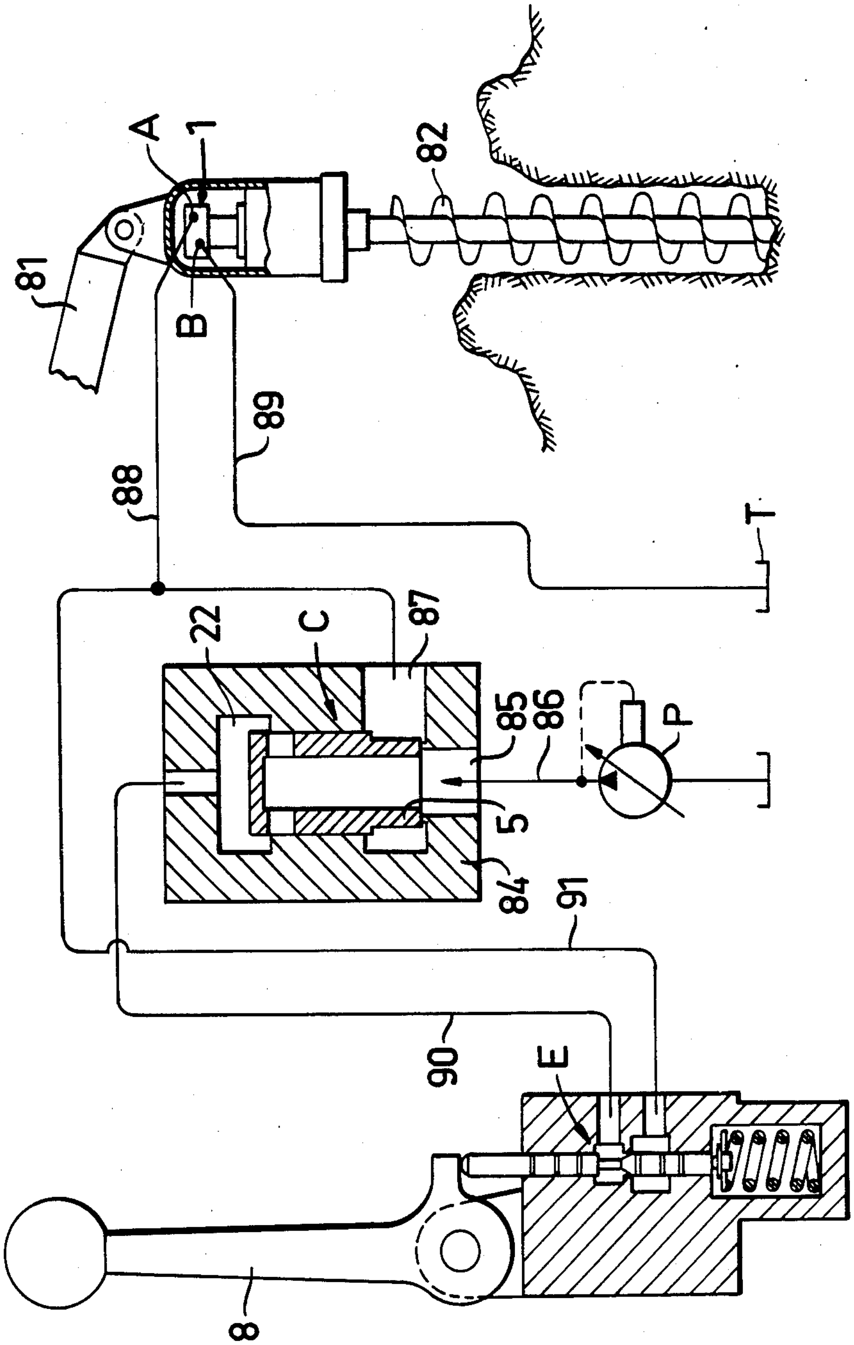
FIG. 18 is a schematic view of a valve means according to the invention for controlling a rotary motor.

In FIG. 18 the present valve means is shown by way of an embodiment for controlling a non-reversible hydraulic motor 1 suspended on a crane jib 81 and driving an earth drill 82. This valve means comprises a seat valve C located in a valve housing 84 without surrounding cartridge 6, which also is possible in the aforedescribed embodiments. The inlet 85 of the valve means is connected through a conduit 86 to a pump P, and its outlet 87 is connected to the motor port A through a conduit 86. The motor port B is connected through a return conduit 89 to the tank T.

For controlling the valve cone of the seat valve, a lever-operated pilot valve E is provided in the way described above, which pilot valve is connected through a channel 90 to the space 22 behind the valve cone 5 of the seat valve and through a second channel 91 is connected to the outlet 87 of the seat valve. By this simple valve means, thus, the motor can be started and stopped, and its speed can be adjusted infinitely.

The pressure compensated valve means described above with reference to FIGS. 9 and 10 has in closed position an internal leakage past the pressure reducing valve, which connects the inlet of the main valve with its outlet via the associated pilot flow channel. This leakage is due to that each pressure reducing valve, as shown in FIG. 13 for example, has a sealing gap between its control slide 57 and the cylinder wall surrounding the same, which gap cannot be sealed by, for example, O-rings or other sealings because the adjusting forces available and acting on the control slide in the pressure reducing valve are much too small for being capable to overcome the friction forces which would arise when said gap would be sealed by a sealing. As this internal leakage occurs in a pilot flow channel, it is small per se and can be neglected in many applications of the present valve means.

Figure 19:
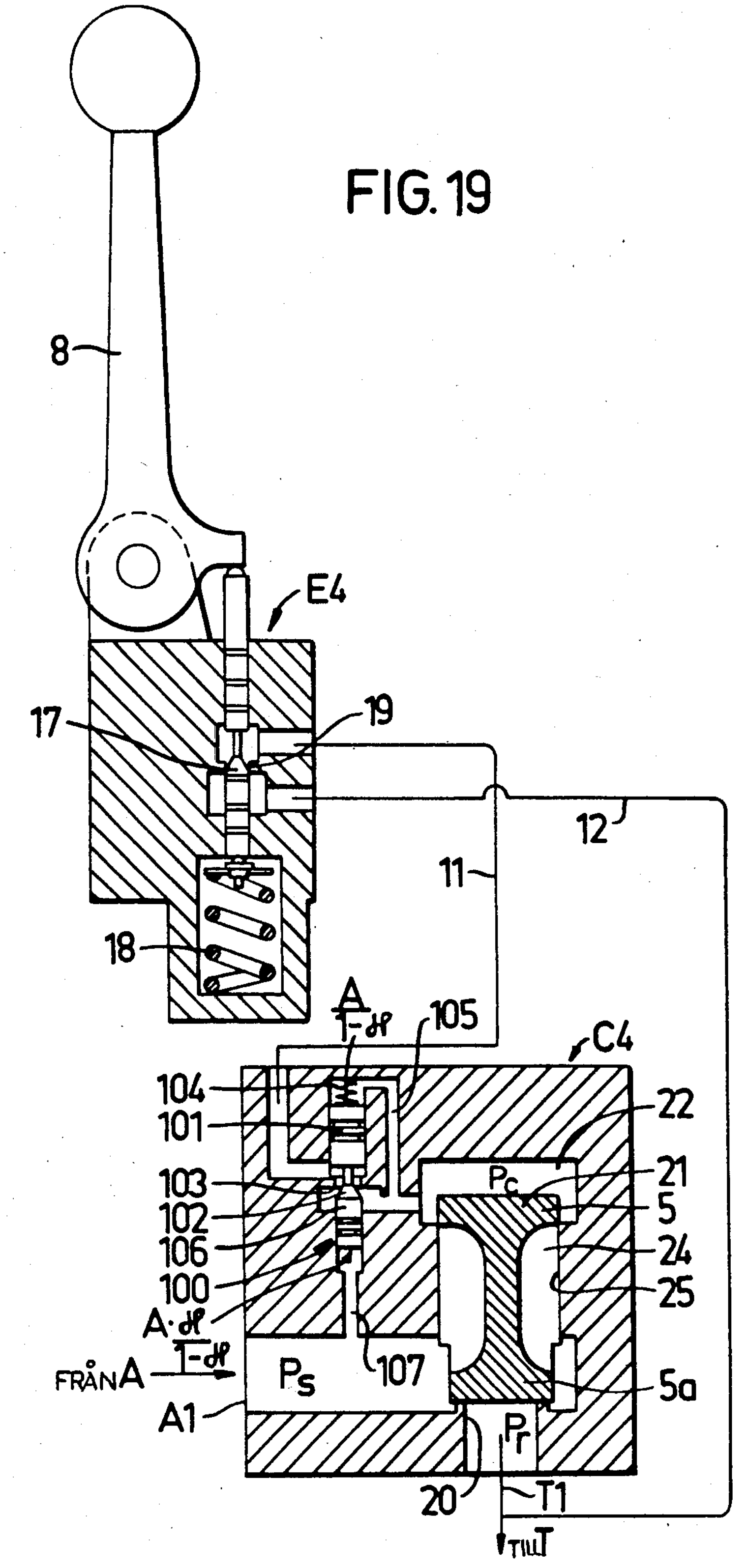
FIG. 19 is a schematic section of a modified embodiment with a pressure compensator in direct connection to a seat valve.

In FIG. 19, however, an embodiment is shown, by means of which the pressure compensated valve means according to the invention is fully tight in closed position. At this embodiment the pressure reducing valve 100 connected to the respective seat valve (in FIG. 19 are shown for reason of simplicity only the seat valve C4 and the associated pressure reducing valve 100) is arranged so as instead of sensing the return pressure of the seat valve to sense the inlet pressure Ps of the seat valve and the pressure after the valve cone 5 of the seat valve in the associated pilot flow channel, i.e. the channel 11 in FIG. 19, in such a manner, that this corresponds to the sensing of the return pressure. This is possible owing to the principle, according to which the present seat valves C1–C4 act, implying that there always prevails a certain relation between the inlet pressure Ps, the return pressure Pr and the pressure in the pilot flow channel Pc. This relation can mathematically be expressed as $$Pc=\alpha \cdot Ps+Pr(1-\alpha)$$

where $\alpha$ is the area relation of the main valve cone 5. Said equation yields the return pressure Pr being equal to $$\frac{Pc}{1-H}-\frac{H-Pa}{1-H}$$

The return pressure Pr, which at the embodiment described above acts on the slide area A ($d_2$ in FIG. 14) of the pressure reducing valve, at this embodiment is arranged to act on a slide area $A/1-\alpha$ of the control slide 101 of the pressure reducing valve 100, while the inlet pressure Pa is arranged to act on the slide area $$\frac{A \cdot H}{1-H}$$

of control slide 101 which, thus, is turned in the direction opposed to the corresponding slide area $d_2$ of the pressure reducing valves shown in FIGS. 13–15. More precisely, the pressure reducing valve 100 shown in FIG. 19 has a conic valve cone 102 for co-action with a valve seat 103, through which the pilot flow channel 11 extends from the space 22 of the main valve C4 to the associated pilot valve E4. The valve cone 102 is rigidly connected to the control slide 101 with the area $A/1-\alpha$ through a narrow portion extending through the valve seat 103, which slide 101 is subjected to the action of a compression spring 104 and of the pressure Pc in the pilot flow channel through a channel 105. The valve cone 102 of the pressure reducing valve further is rigidly connected to the second control slide 106, which has the slide area $$\frac{A \cdot H}{1-H}$$

and via channel 107 is under the action of the inlet pressure Ps, which thus is counteracted by the spring force and pressure Pc. To the pressure reducing valve 100 applies in general what previously has been stated for the pressure reducers 54, 60 and 65.

With the pressure reducing valve 100, thus, there is no sealing gap between the inlet and outlet of the main valve C, and thereby also a fully tight valve means is obtained, under the prerequisite, of course, that the seats in each main valve C and pilot valve E are tight, and that each pilot valve E like the aforedescribed ones is sealed against internal leakage by suitable sealings.

Figure 20:
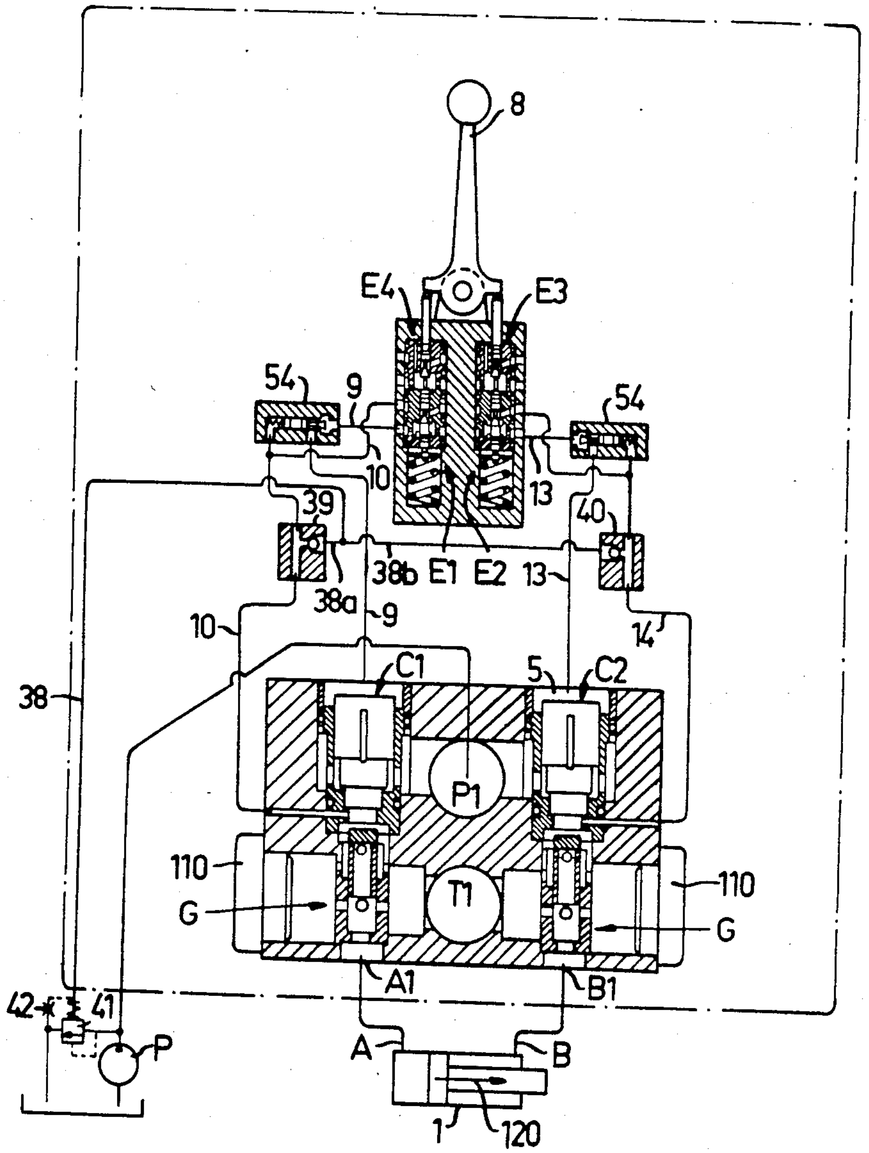
FIG. 20 shows schematically a modified embodiment of the valve means in FIG. 11 with load sensing, pressure limitation and compensation and with floating position.
Figure 21:
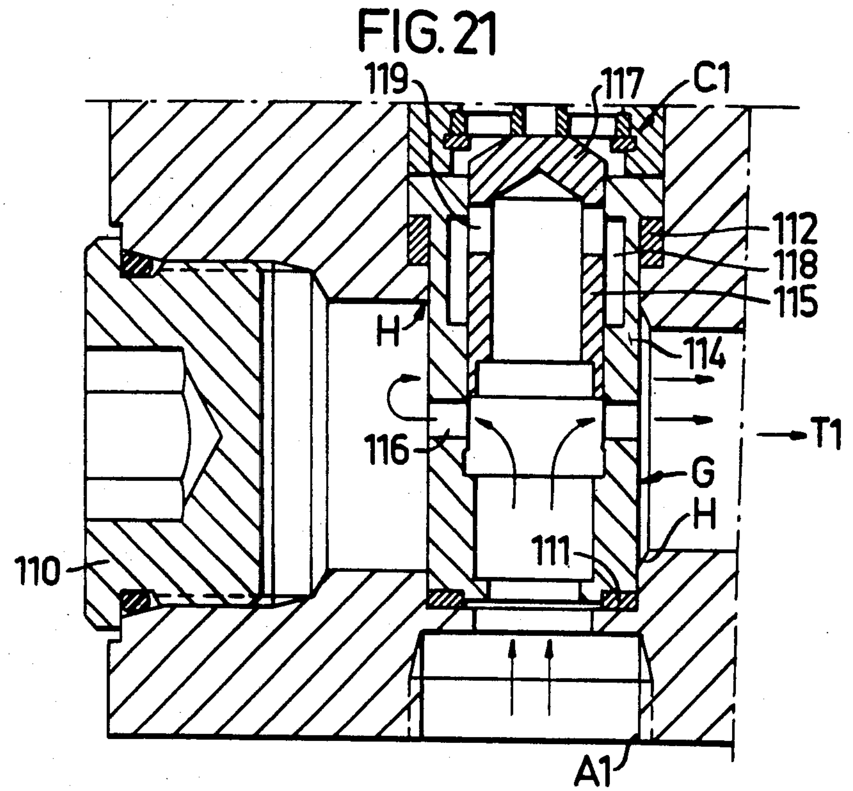
FIGS. 21 and 22 are enlarged sections of a floating position device according to FIG. 20 in a first and, respectively, second position.
Figure 22:
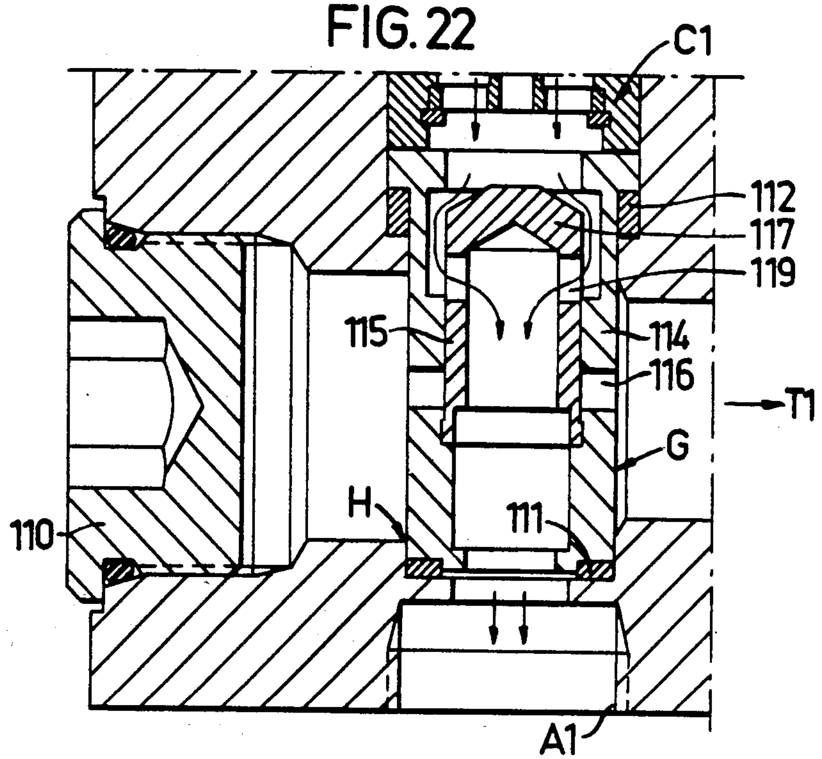

In FIGS. 20–22 a floating position embodiment of the valve means according to FIG. 11 is shown. Floating position is to be understood as a position, in which the motor ports A and B simultaneously are connected to the tank connection T1. In floating position it is possible for the piston in the cylinder to move freely, i.e. to float, under the action of exclusively external forces. As mentioned earlier, floating position can be established by simultaneously adjusting the two pilot valves E which control the outlet valves C3 and C4 of the valve means. This method, however, requires a special design of the pilot valve part of the valve means which permits simultaneous actuation of the pilot valves only of the outlet valves.

The floating position embodiment shown in FIGS. 20–22 is intended for obtaining floating position only when the valve means is set in its neutral position. This is achieved according to the present invention in that the two outlet valves C3 and C4 designed as exchange cartridges at the embodiment according to FIG. 11 are exchanged together with associated check valves D against special floating position devices or cartridges G, for which special seats H are provided in the valve housing which are coaxial with the respective motor port connection A1,B1 and the inlet valve C1,C2. For inserting these floating position cartridges G, the outlet valve cartridges C3,C4 are removed and their openings are blocked with plugs 110. Thereafter the inlet valves C1,C2 which also are designed as exchangeable cartridges are removed, and the floating position cartridges G are inserted into the respective seat H. Thereafter the inlet valves C1 and C2 are again mounted which keep the respective floating position cartridge G in place in the respective seat H, which has necessary sealings 111 and 112.

Each floating position cartridge G comprises a sleeve 114 rigidly attached in the seat H and a valve cone 115, which is movable in its sleeve 114 between two end positions, viz. an upper position (FIG. 21), in which the motor port connection A1,B1 is connected to the tank connection T1 via through openings 116 in the sleeve 114, and in which the valve cone 115 closes the connection to the associated inlet valve C1,C2, and a lower end position (FIG. 22), in which the valve cone 115 closes the openings 116 of the sleeve, i.e. the connection to the tank connection T1, and opens the connection to the inlet valve C1,C2. For this purpose, each valve cone 115 is designed like a sleeve, with a closed end 117 facing to the inlet valve C1,C2 and with an open end facing to the motor port connection A1,B1, and comprises in the vicinity of the closed end 117 openings 119, through which hydraulic liquid can flow from the inlet valve via a cylindric space 118 in the sleeve 114 to the associated motor port connection A1,B1 and therewith to the motor port A and, respectively, B.

Normally, i.e. with the operating lever 8 in neutral position, the valve cone 115 of each floating position cartridge is in its upper end position (FIG. 21), and thereby flow is permitted to pass between the motor port connection A1,B1 and the tank connection T1. At such operation of the operating lever, that the inlet valve C1 of the valve means is actuated to bring about main flow from the pump connection P1 to the motor port A through the inlet valve C1, this flow will force the valve cone 115 of the floating position cartridge to move to its lower end position (FIG. 22), and thereby the valve cone 115 opens a passage for the main flow from the pump connection P1 to the motor port A at the same time as it closes the connection to the tank connection T1. The second motor port B still is in connection with the tank T in that its floating position cartridge is located with its valve cone 115 in the upper end position, and thereby the piston of the cylinder is caused to move in the direction marked by the arrow 120 in FIG. 20.

In the same way, the inlet valve C2 of the valve means can be actuated for obtaining a main flow from the pump connection P1 to the motor port B through the floating position cartridge G located in this main flow channel, whereby the piston of the cylinder 1 is caused to move in a direction opposed to that indicated by the arrow 120 in FIG. 20. The floating position cartridge G located in the main flow channel P1–A1, of course, is in its upper end position and permits the flow from the motor port A to pass to the tank T.

Figure 23:
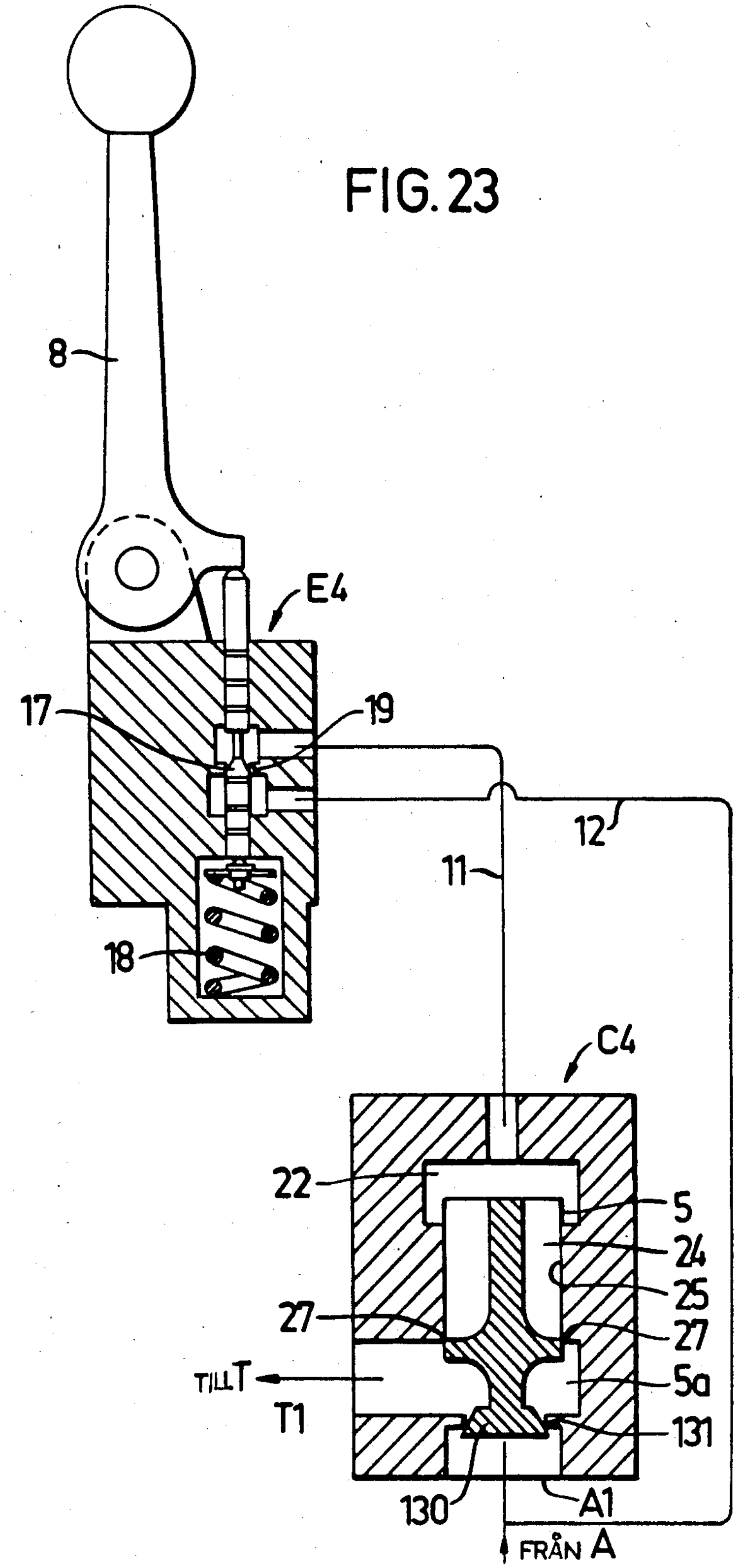
FIG. 23 shows schematically a modified embodiment of a seat valve in the valve means.

In FIG. 23 an alternative embodiment of the main valve C with so-called inverted pilot flow is shown, which implies that the pilot flow is directed into the control chamber 22 of the main valve from the pilot valve E, and from said chamber 22 is directed via the connecting channels 24 of the valve cone and the control throttlings to the main flow channel after the main valve C. At embodiments described earlier, see for example FIGS. 3 and 4, the pilot flow proceeds from the control chamber 22 to the pilot valve E and from this to the main flow channel after the main valve C.

For achieving this so-called inverted pilot flow, the valve cone 5 of the main valve is provided with a cone portion 130, which is closed position of the main valve abuts a valve seat 131 and closes entirely the main flow channel before the valve cone 5. The control chamber 22, however, in this position is connected to the main flow channel after the main valve C through the connecting grooves 24 and the control throttlings 27 depending on the position of the valve cone.

Figure 24:
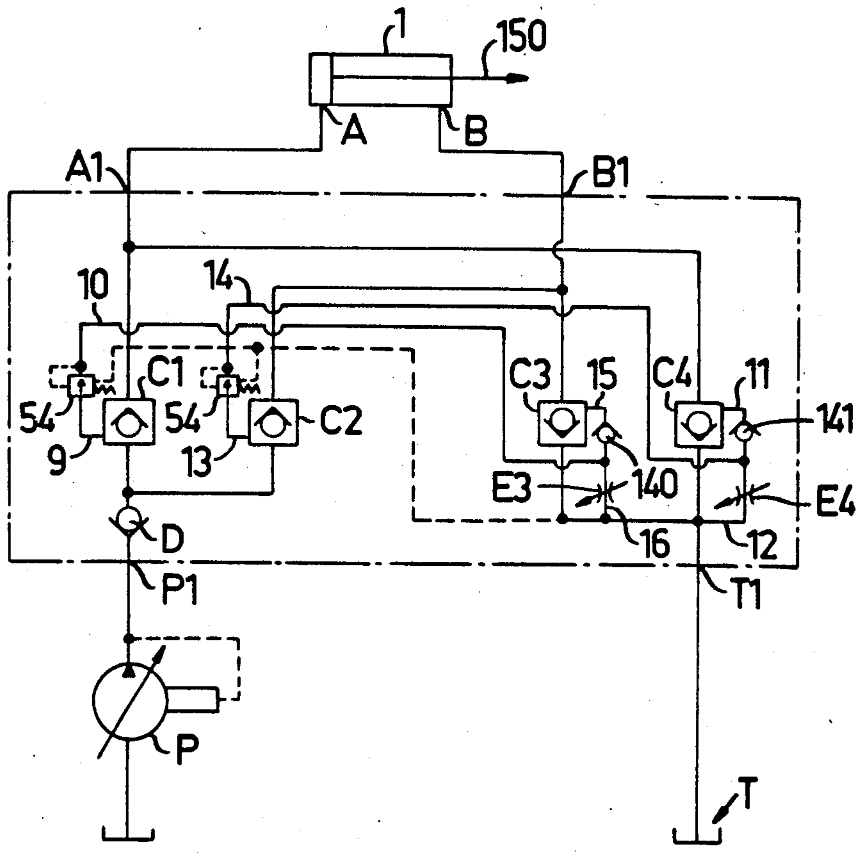
FIG. 24 shows a hydraulic layout of an embodiment of the present valve means with only two pilot valves for controlling all main valves of the valve means.

At embodiments of the valve means or directional valve according to the present invention described above, every main valve C is controlled each by its pilot valve E. As four main valves C are provided, thus, four pilot valves E are required which are actuated in pairs by the operating lever 8. FIG. 24, differing therefrom, shows schematically an alternative embodiment with only two pilot valves E for controlling and operating four main valves C, which pilot valves are designated by E3 and E4. The previous pilot valves E1 and E2 have been abandoned.

At the alternative embodiment shown in FIG. 24, the main valves C1 and C3 are arranged to be controlled by the pilot valve E4 in common. The main valve C1 is connected through a pilot flow channel 9,10 to the pilot valve E3 via a pressure reducing valve 54 or 100, and the main valve G3 is connected through its pilot flow channel 15 and a check valve 140 located therein to the same pilot valve E3 as the main valve C1. In the same way, the main valve C2, through its pilot flow channel 13,14 and a pressure reducing valve 54 or 100 located therein, is connected to the pilot valve E4. To this pilot valve E4, thus, also the main valve C4 is connected through its pilot flow channel 11 and a check valve 141 located therein. The pilot valves E3 and E4, as the pressure reducing valves 54, are connected to the tank T, as appears from FIG. 24.

Upon actuation of the pilot valve E3 the main valves C1 and C3 open, whereby the pump P is connected to the motor port A, and the motor port B to the tank, and the piston of the cylinder thereby is caused to move in the direction marked by 150. The pressure reducing valve 54 or 100 reduces hereby the pressure in the pilot flow channel 10 to the pilot valve E3, so that a constant pressure drop over the pilot valve E3 is obtained, irrespective of the size of the pump pressure. The valve, in other words, is pressure compensated.

Upon actuation of the pilot valve E4, thus, the piston of the cylinder 1 is caused to move in the direction opposed to the arrow 150. Also here pressure compensation is obtained through the pressure reducing valve 54 or 100 in the pilot flow channel 14 to the pilot valve E4.

The aforedescribed function applies to lifting movement. When instead the piston of the cylinder 1 is subjected to a load acting in the same direction as the piston movement, so-called lowering movement, the pressure reducing valve 54 concerned is closed, and therefore also the corresponding main valve C1,C2 is closed. Thereby the main flow from the pump P is prevented from arriving at the cylinder 1. The cylinder 1 hereby receives, instead, the main flow through anti-cavitation function of the associated outlet valve C3,C4 in the way described above. Hereby main flow from the pump is "saved" which, instead, can be used for some other function. In other words, a valve means is obtained which saves energy, at the same time as the pilot valve part and the control part are simplified in that only two pilot valves are required.

Though not shown, it is possible within the scope of the present invention to build-in the pressure reducing valves 43 and 44 into the respective outlet valve C3,C4.

The present invention is not restricted to what is set forth above and shown in the drawings, but can be changed and modified in many different ways within the scope of the invention idea defined in the attached claims.

What is claimed is:

1. A seat valve arrangement for controlling a main supply flow of high pressure in a main supply flow passage by means of a pilot flow derived from said main supply flow, comprising a valve housing incorporating a part of the main supply flow passage, a valve seat surrounding said passage within the valve housing, a valve body slidably located within a cylindric space of the valve housing for movement from a closed position to an open position, a pilot flow chamber situated within the valve housing at the valve body end remote from the valve seat and being in communication with the main supply flow passage upstream of the valve seat as well as downstream thereof, a variable flow restriction arranged in the connection between the main supply flow passage upstream of the valve seat and the pilot flow chamber, and a pilot valve arranged in the connection between the pilot flow chamber and the main supply flow passage downstream of the valve seat, for creating said adjustable pilot flow for controlling of the main supply flow as a function of the pilot flow, and a pressure reducing valve means located in the pilot flow connection between the pilot flow chamber and the pilot valve for rendering said valve independent of pressure drop, by sensing the inlet pressure (Ps) in the main flow passage before the valve seat as well as the pressure after the valve seat in the associated pilot flow connection in such a way that said sensings correspond to a sensing of the return pressure (Pr) after the valve seat.

2. A seat valve arrangement as claimed in claim 1, wherein said pressure reducing valve means comprising a first control slide element for sensing the pressure in the pilot flow connection between the pressure reducing the valve means and the pilot valve, said pressure being dependent of the return pressure (Pr) in the main supply flow passage downstream of the valve seat, a second control slide element connected to said first control slide element for sensing the inlet pressure in the main supply flow passage upstream of the valve seat and a valve cone located between said first and second slide element for cooperating with a valve seat through which the pilot flow connection from the pilot flow chamber to the pilot valve extends.

3. A seat valve arrangement as claimed in claim 2, wherein said valve cone is formed on the end of the second control slide element and connected to the first control slide element with a cylindrical small diameter portion extending through the valve seat of the pressure reducing valve means.

4. A seat valve arrangement as claimed in claim 3, wherein the first control slide element is subjected to a force from a spring means and to the pressure (Pc) in the pilot flow chamber.

5. A seat valve arrangement as claimed in claim 2, wherein the first control slide element is subjected to a force from a spring means and to the pressure (Pc) in the pilot flow chamber.

6. A seat valve arrangement as claimed in claim 2, wherein the first control slide element at its end facing the valve cone has a diameter A and at its other end a diameter $$\frac{A}{1-\zeta'},$$

while the second control slide element at its end remote from the valve cone has a diameter $$\frac{A \times \zeta}{1-\zeta'},$$

where $\xi$ represents the area relation of the valve body.

* * * * *